United States Patent
Popp

(10) Patent No.: US 10,787,188 B2
(45) Date of Patent: Sep. 29, 2020

(54) BABY CARRIAGE

(71) Applicant: EnDePro GmbH, Redwitz a.d. Rodach (DE)

(72) Inventor: Alexander Andre Popp, Redwitz a.d. Rodach (DE)

(73) Assignee: EnDePro GmbH, Redwitz a.d. Rodach (DE)

( * ) Notice: Subject to any disclaimer, the term of this patent is extended or adjusted under 35 U.S.C. 154(b) by 0 days.

(21) Appl. No.: 15/328,127

(22) PCT Filed: Jul. 21, 2015

(86) PCT No.: PCT/IB2015/001217
§ 371 (c)(1),
(2) Date: Jan. 23, 2017

(87) PCT Pub. No.: WO2016/012849
PCT Pub. Date: Jan. 28, 2016

(65) Prior Publication Data
US 2017/0217470 A1   Aug. 3, 2017

(30) Foreign Application Priority Data

Jul. 23, 2014   (DE) .......................... 10 2014 010 731
Sep. 10, 2014   (DE) .......................... 10 2014 013 065
Jun. 30, 2015   (DE) .......................... 10 2015 008 317

(51) Int. Cl.
*B62B 7/06*   (2006.01)
*B62B 7/14*   (2006.01)
(Continued)

(52) U.S. Cl.
CPC .............. *B62B 7/062* (2013.01); *B62B 7/004* (2013.01); *B62B 7/064* (2013.01); *B62B 7/10* (2013.01);
(Continued)

(58) Field of Classification Search
CPC .......... B62B 7/06; B62B 7/062; B62B 7/064; B62B 9/20; B62B 2205/20; B62B 2205/22; B62B 2205/003
See application file for complete search history.

(56) References Cited

U.S. PATENT DOCUMENTS 3,092,394 A * 6/1963 Burke .................. B25H 5/00
                                                       280/32.6
4,836,573 A * 6/1989 Gebhard ............... B62B 7/147
                                                       280/47.38
(Continued)

FOREIGN PATENT DOCUMENTS

DE      202014102891      8/2014

*Primary Examiner* — Frank B Vanaman
(74) *Attorney, Agent, or Firm* — Pandiscio & Pandiscio

(57) ABSTRACT

A baby carriage having lateral articulated joints, each lateral articulated joint having a connection for a leg of a push bar, a front wheel strut and/or a rear wheel strut, of which at least two elements of the baby carriage are pivotable relative to one another about an articulated axis extending transversely with respect to the travel direction of the baby carriage. The at least two elements of the baby carriage being connected at an articulated joint, so as to be pivotable relative to one another, coupled together in a rotatably fixed manner so as to not be pivotable to one another. The lateral articulated joints being configured to be selectively released and selectively fixed, whereby to permit selective pivoting of some elements of the baby carriage relative to other elements of the baby carriage.

30 Claims, 23 Drawing Sheets

(51) Int. Cl.
    *B62B 7/10*    (2006.01)
    *B62B 7/00*    (2006.01)
    *B62B 9/20*    (2006.01)

(52) U.S. Cl.
    CPC .................. *B62B 7/14* (2013.01); *B62B 9/20* (2013.01); *B62B 2205/003* (2013.01); *B62B 2205/22* (2013.01)

(56) References Cited

U.S. PATENT DOCUMENTS

| | | | | |
|---|---|---|---|---|
| 5,028,061 | A * | 7/1991 | Hawkes | B62B 7/04 280/47.4 |
| 5,244,228 | A * | 9/1993 | Chiu | B62B 9/24 280/47.4 |
| 5,674,165 | A * | 10/1997 | Cohen | A63B 21/015 280/47.371 |
| 6,101,678 | A * | 8/2000 | Malloy | B62B 5/06 16/430 |
| 8,012,070 | B2 * | 9/2011 | James | A63B 21/00069 482/114 |
| 2011/0181024 | A1 * | 7/2011 | Chicca | B62B 7/062 280/642 |
| 2014/0167393 | A1 | 6/2014 | Tsai et al. | |

* cited by examiner

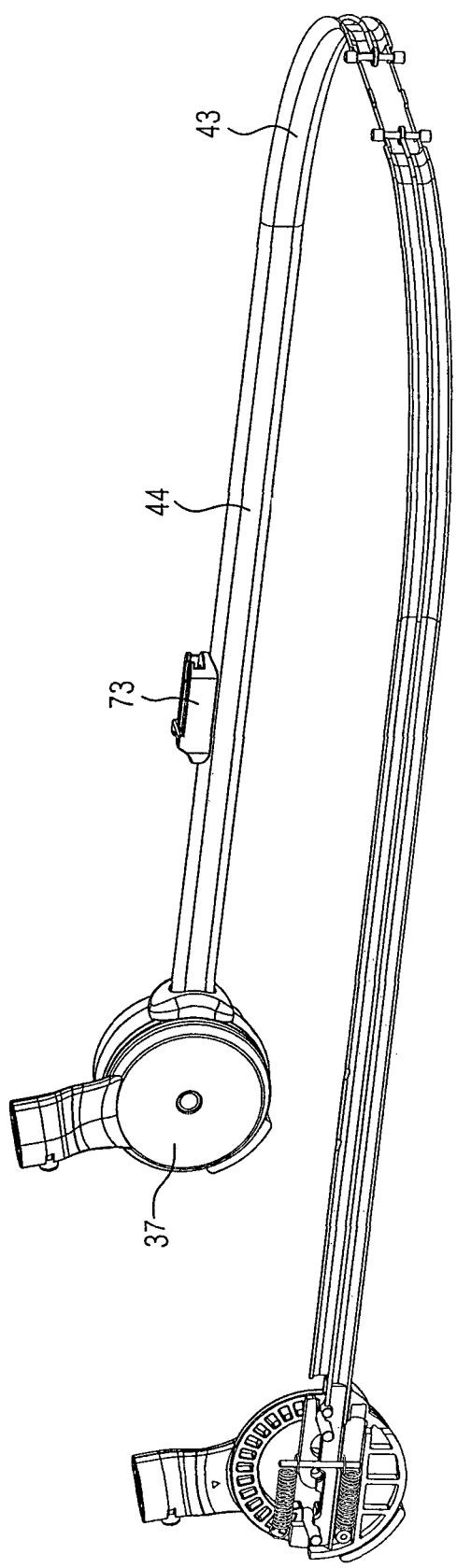

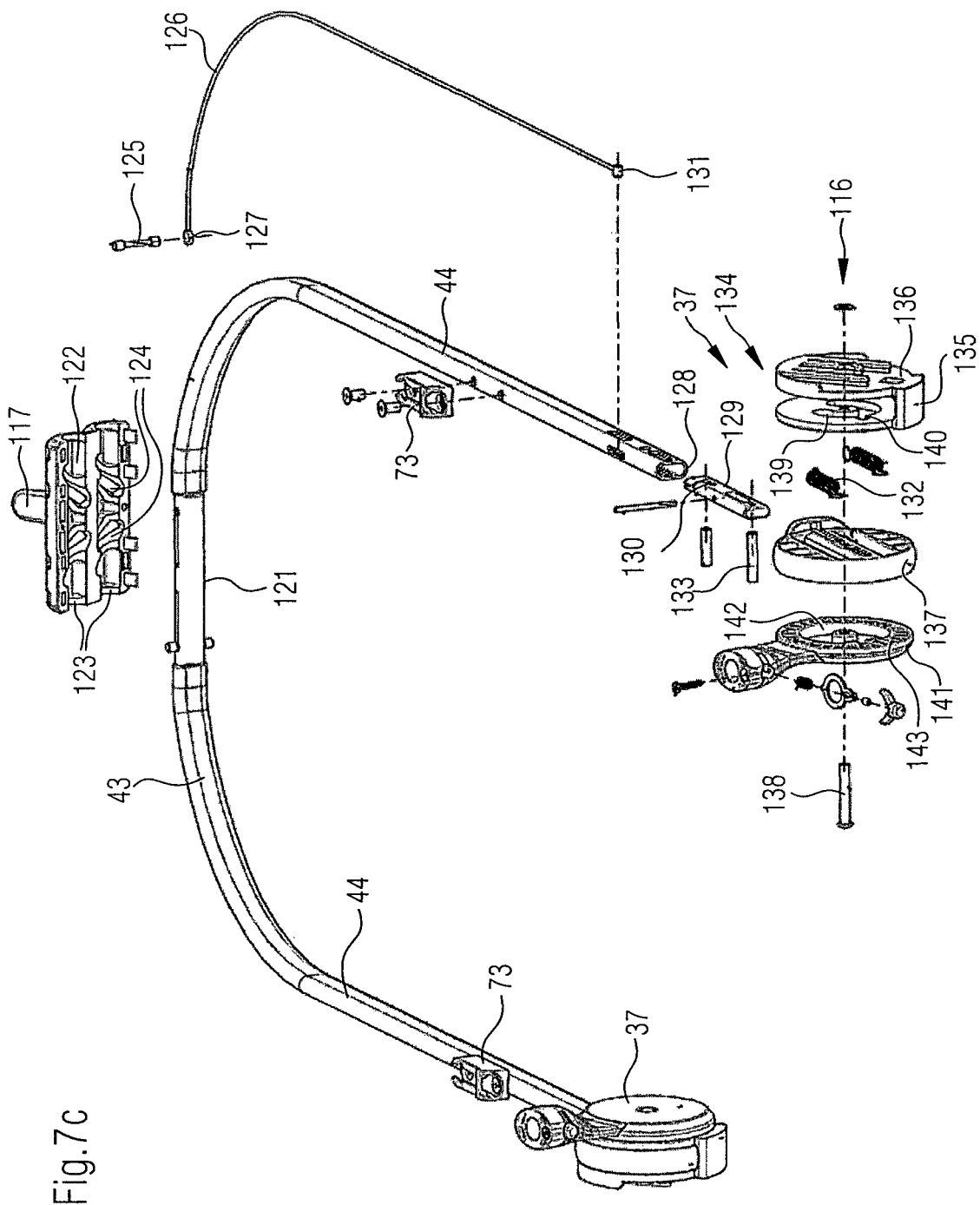

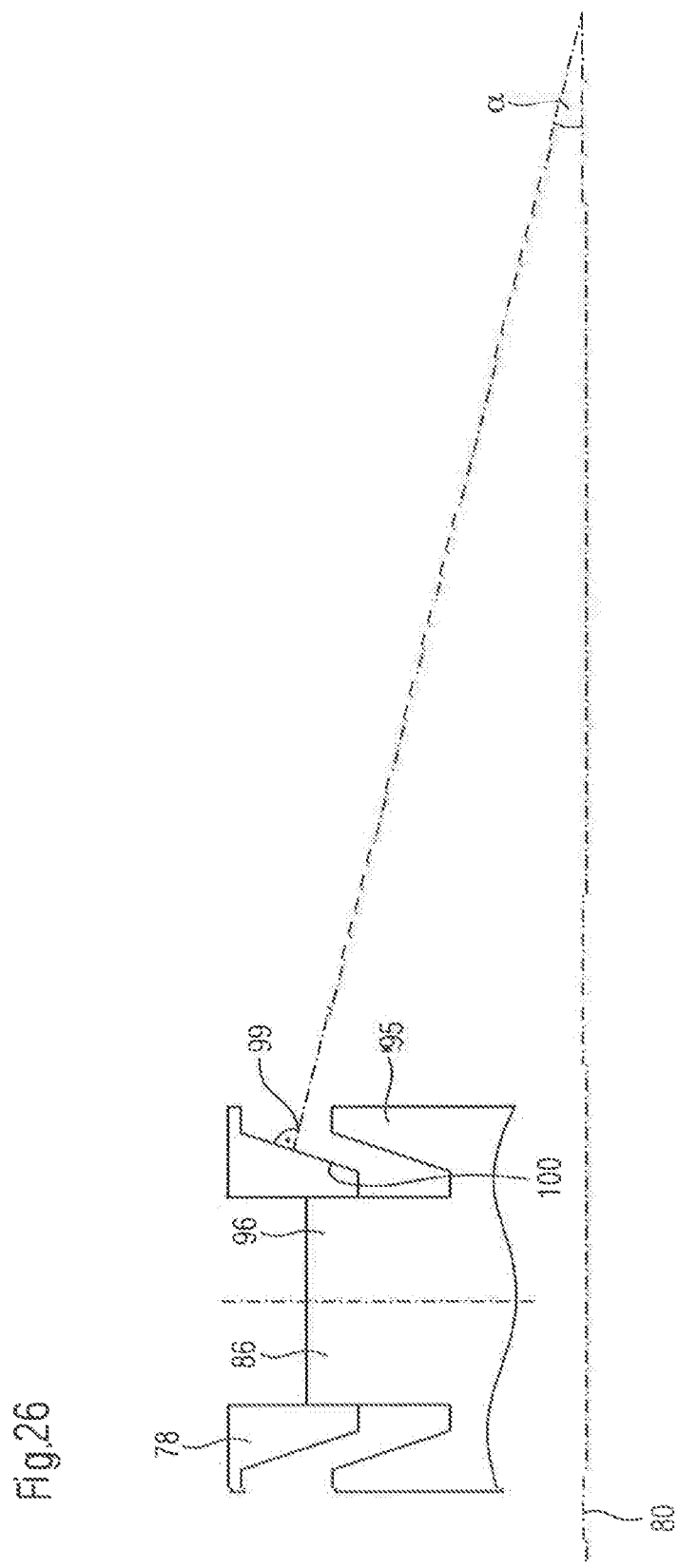

US 10,787,188 B2

BABY CARRIAGE

REFERENCE TO PENDING PRIOR PATENT APPLICATIONS

This patent application claims benefit of International (PCT) Patent Application No. PCT/IB2015/001217, filed 21 Jul. 2015 by EnDePro GmbH for BABY CARRIAGE, which claims benefit of: (i) German Patent Application No. DE 10 2014 010 731.0, filed 23 Jul. 2014, (ii) German Patent Application No. DE 10 2014 013 065.7, filed 10 Sep. 2014 and (iii) German Patent Application No. DE 10 2015 008 317.1, filed 30 Jun. 2015, which patent applications are hereby incorporated herein by reference.

FIELD OF THE INVENTION

The invention is directed to a baby carriage, comprising lateral articulated joints, each having a connection for a leg of a push bar, a front wheel strut and/or a rear wheel strut, of which at least two elements are pivotable relative to one another about an articulated axis extending transversely with respect to the travel direction, the connection for a first of at least two elements of an articulated joint which are pivotable relative to one another being connected in a rotatably fixed manner to an inner disk-shaped part of the articulated joint, while the connection for a second of the at least two elements of the articulated joint in question which are pivotable relative to one another is connected or coupled in a rotatably fixed manner to two articulated plates of the articulated joint in question, in parallel to the disk-shaped part, which grip the inner disk-shaped part at its two flat sides.

BACKGROUND OF THE INVENTION

Baby carriages should be universally usable, being convenient, functional, and stable during use; in contrast, when not in use, baby carriages should cause preferably little inconvenience, i.e., should take up as little space as possible.

In particular the latter condition is perhaps the most difficult to meet, since it is achievable only by an efficient folding mechanism. However, it is not enough to provide joints at suitable locations; instead, these articulated joints in the unfolded state should be preferably rigid so that the baby carriage maintains sufficient stability. In addition, the adjustment of the joint should be as simple and convenient as possible. When the baby carriage is folded up, its particularly bulky components, such as the push bar, have proven to be problematic.

SUMMARY OF THE INVENTION

The disadvantages of the described prior art have resulted in the object of the invention, to refine a generic baby carriage in such a way that it is foldable to a preferably small size, but in the unfolded state is as stable as possible.

For a generic baby carriage, this object is achieved in that at least two lateral articulated plates are pulled toward one another by means of a connecting part and are thus frictionally and/or interlockingly pressable from both sides against the inner disk-shaped part of the articulated joint in order to lock the articulated joint, but by loosening the connecting part they are releasable from the inner disk-shaped part to such an extent that the frictional and interlocking connection is released for relative adjustment of the articulated joint.

The two lateral articulated plates are not rigidly connected to one another at all points, so that they grip the inner disk-shaped part on the left and right sides. The lateral articulated plates are preferably directly connected to one another only along a portion of their periphery, namely, in that circumferential area where the pivotable element in question branches off. The distance between the two lateral articulated plates is exactly specified by the peripheral connection only at this location; in the oppositely situated area of the periphery and in a middle area of the articulated plates, they are not rigid, but, rather, due to their limited elastic material properties are able to bend relative to one another, i.e., toward one another or possibly away from one another, for example in the direction of the articulated axis. The articulated axis, which preferably is made of metal, may pass through the lateral articulated plates and also the inner disk-shaped part, approximately in the area of the center of the joint. However, for the end-side caps or radial extensions of this articulated axis, their axial distance in the longitudinal direction of the articulated axis is dimensioned such that they allow play between the lateral articulated plates and the inner disk-shaped part which they grip. Thus, in the area of the articulated axis, such end-side caps do not establish a frictional or interlocking connection between the lateral articulated plates on the one hand and the inner disk-shaped part on the other hand. Instead, this is the task of a connecting part in the area of the joint, which is controllable by a person and which, when adjusted, acts on each of the two lateral articulated plates in order to exert, or not exert, a tensile force between them in parallel to the articulated axis.

The two lateral articulated plates are preferably influenced by means of a connecting part which is movable with respect to the lateral articulated plates and which may possibly even extend directly through the inner disk-shaped part of the articulated joint and be able to exert a substantial tightening effect on the two lateral articulated plates, as the result of which they are pressed from both sides against the inner disk-shaped part, thus forming a frictional and/or interlocking connection with same. By resetting the movable connecting part, the temporarily interconnected parts may be released from one another in order to release the frictional and interlocking connection and then allow relative adjustment of the mutually pivotable parts.

As explained in greater detail below, the connecting part may act on the two lateral articulated plates in the manner of a wedge, for example, in order to bring them together or press them against the inner disk-shaped part with great force. It is very advantageous that within the scope of the coupling between the connecting part and the two lateral articulated plates, a transfer of force takes place, so that the controlling force that acts on the connecting part is preferably translated into a comparatively larger pressing force, so that in the locked state the articulated joint behaves as if the pivotable elements, which themselves are articulatedly pivotable relative to one another, were made of a single piece.

Such behavior is also intensified by pressing the two lateral plates against the inner disk-shaped part from opposite sides, so that they act like a bearing yoke which grips and supports the inner disk-shaped [part] as a portion of a wheel on both sides of its base plane. Radial relative movements are precluded due to a pivot axis which passes jointly through the inner disk-shaped part and both lateral articulated plates.

Even with the connecting part loosened, the lateral articulated plates can be rotated with respect to the inner disk-shaped articulated part, but at the same time, the end caps or other radial widenings of the articulated axis prevent excessive bending away of the lateral articulated plates, thus maintaining the structural stability of the joint.

In contrast, if the joint is in the locked state due to reversing the connecting part, the two lateral articulated plates are connected to one another overall at three locations: first, they are continuously connected in the area of the rigid peripheral connection between the two lateral articulated plates, where their spacing thus always remains constant; second, they are connected by the articulated axis, which prevents the radial relative movements of the various articulated parts and limits axial relative movements of the two lateral articulated plates; and third, they are connected by the connecting part, which in the locked state seeks to pull the two lateral articulated plates together with a great force, which in the preferred case is greater than the actuating force acting on the connecting part, until the lateral articulated plates are frictionally or even interlockingly pressed against the inner disk-shaped articulated part, in any case in the vicinity of the connecting part. The distance between the lateral articulated plates remains constant in the area of the rigid peripheral connection, and in between there is a deformation area where the articulated plates bend in order to meet all of the constraints imposed on them.

Moreover, each of the lateral articulated plates may be made up of only a single part, or also multiple parts if this is necessary from a manufacturing standpoint, for example because the parts are otherwise not manufacturable by injection molding or cannot be demolded.

Further advantages result from providing the locking of at least one articulated joint in two stages, comprising automatic engagement and manually actuated locking. By separating the locking operation into two separate processes which occur independently of one another, but which are associated with one another in that the manually actuated locking requires the prior automatic engagement, while disengagement is possible only after the lock has been manually released beforehand, different objectives which usually compete with one another may be reconciled in the design of an articulated joint. This is because during the automatic engagement operation, the actuation is facilitated by the correct engageable position being automatically recognized, while the manual locking provides preferably rigid locking, with the elements adjoining the joint, such as the push bar in particular, being immovably connected to the joint. The latter is made possible due to the fact that, with certainty that the joint is in an optimal position for locking due to the automatic engagement, a person may confidently exert the force effect that is necessary for a rigid connection without damaging any parts of the joint. Enormous actuating forces may thus act in a controlling manner on a connecting part between two lateral articulated plates, and if such a controlling actuating force again results in an increase due to the coupling mechanism between the articulated plates, extremely large pressing forces may develop between the lateral articulated plates and the inner disk-shaped part.

It has proven advantageous that for arresting and/or locking an articulated joint of the chassis, in particular between the connection for the push bar on the one hand and the housing of the joint on the other hand, interior areas of the end-face sides of the housing are frictionally pressed against at least an inner portion of the joint, and/or that in the direction of the rotation axis of the joint in question, end-face sides of one part are frictionally pressed against another inner part or an interior area of the joint. Such a frictional connection is capable of transmitting large forces, and thus contributes to a particularly rigid articulated joint.

The articulated joint may be enclosed by a housing which has a cylindrical basic shape, with a lateral surface enclosing the rotation axis or articulated axis, and two end-side faces which close off the lateral surface at both ends. It is thus possible, for example, to join an end-face side of the housing to a part to be connected, for example via an adapter having a seat- or bowl-shaped attachment, while another housing section may be fixedly joined to a further connection, for example for a front or rear wheel strut. The other pivotable connections, for example for the push bar or for a front or rear wheel strut, may be situated adjacently or in between, for example in the area of the lateral surface.

The invention may be refined in such a way that depressions and/or undercuts in which an articulated element, which is displaceable relative to same, can engage are provided at the inner sides of end-side faces of the housing or of one or more parts fixed thereto. The boundary surfaces of these depressions and/or undercuts determine the room for play for the part or articulated element accommodated therein.

Under special conditions, the shape of these depressions and/or undercuts in each case may allow different adjustment options or directions. An adjustment is preferably possible in a different spatial direction only for one or more discrete positions for a spatial direction.

In particular, it may be provided that the adjustable articulated element is adjustable with respect to the rotation axis or articulated axis in two different spatial directions, in particular in the radial direction on the one hand and in the azimuthal direction on the other hand. As indicated above, these two adjustment options are generally not possible at the same time; rather, an adjustment option in one spatial direction requires that "locking" has occurred, or a delimitation or restriction is active, in the other spatial direction.

The invention proposes that the adjustable articulated element is carried along in the azimuthal direction by a part of the baby carriage that is connected to the joint, in particular by a connector or side leg of the push bar. The azimuthal position of the adjustable articulated part thus corresponds to the swivel position of the part of the baby carriage connected thereto, in particular a part of its frame or chassis, such as the push bar or a front or rear wheel strut.

The invention may be refined in that depressions at the inner sides of end-side faces of the housing or of one or more parts fixed thereto follow an arc-shaped curve that is concentric with respect to the rotation axis or articulated axis, so that the adjustable articulated element together with the part of the baby carriage connected thereto is rotatably adjustable, in particular between the ends of the arc-shaped area of the depression. Such a rotary adjustment of the movable articulated part is preferably possible only at a certain radial distance from the articulated axis. Accordingly, the locked state of the joint may be controlled or influenced by influencing this radial distance.

The arc-shaped area of the depression may have radial widenings at one, two, or more locations which allow radial movement of the adjustable articulated element at the location in question. Such a radial movement may be equivalent to a locking operation. However, such radial movement is permissible only at certain swivel positions that are predefined by radial widenings of the arc-shaped area of the depression or undercut.

The invention may be advantageously refined in that one, two, multiple, or all radial widenings of the arc-shaped area of the depression extend radially outwardly from the arc-shaped area. In radially outer areas, the lever length is greater due to the longer distance from the pivot axis, so that for the same forces, greater (retaining) torques may be applied, and therefore the arrested and locked state of the joint is even more rigid.

The adjustable articulated element should be pretensioned by at least one spring element in the same radial direction in which one, two, multiple, or all radial widenings of the arc-shaped area of the depression extend. As a result, the adjustable articulated element is automatically pulled by the spring element in its pretensioned direction as soon as the spring element detects a geometrically predefined expansion of the freedom of movement in specifically this (radial) direction.

To ensure that a position cannot be automatically left once it has engaged, one, two, multiple, or all radial widenings of the arc-shaped area of the depression should have a front delimiting surface (in a direction of rotation) and a rear delimiting surface (in the same direction of rotation) for limiting or avoiding further rotary adjustment of the adjustable articulated element engaged therein. While a considerably further rotary adjustment would thus be possible in the unengaged state, in the engaged state this adjustment range is narrowed to the particular swivel position itself. If the mutually parallel front and rear delimiting surfaces of a radial widening of the arc-shaped area extend in parallel to one another, the articulated part that is engageable therein may likewise have two mutually parallel boundary surfaces which rest flatly against these delimiting surfaces of the radial widening, and directly after the engagement operation are able to immediately fulfill a very precise locking function. On the other hand, to avoid unintentional missing of the possible engagement site, the mutually facing edges of the radial widening of the arc-shaped area and/or of the part that is engageable therein may be rounded or recessed in some other way in the azimuthal direction, thus enlarging the opening area of the radial widening, while diminishing the front side of the adjustable articulated part facing the opening area.

To ensure reliable, smooth engagement at a located locking position, the mutually parallel front and rear delimiting surfaces of a radial widening of the arc-shaped area, at least in the vicinity thereof, should have no undercuts, or no undercuts which enclose the adjustable articulated element with an exact fit.

Instead, one, two, multiple, or all radial widenings of the arc-shaped area may have at least one undercut or contact surface, at their radial end facing away from the arc-shaped area or in the vicinity thereof, which is enclosable or contactable by the adjustable articulated element. The undercuts or contact surfaces at this location are no longer used for automatic engagement, but, rather, for the subsequent manual locking.

Within the scope of one preferred embodiment, the undercut or contact surface which is enclosable or contactable by the adjustable articulated element is flat, at least in areas, at or in the vicinity of the end(s) of one, two, multiple, or all radial widenings of the arc-shaped depression. Such a flat surface is particularly suited for large-area frictional contact with a counterpart on the adjustable articulated element.

One refinement of the invention is particularly preferred in which the undercut or contact surface which is enclosable or contactable by the adjustable articulated element is in each case turned outwardly at or in the vicinity of the end(s) of one, two, multiple, or all radial widenings of the arc-shaped depression, i.e., facing the next closest end-side face of the housing. Such a surface experiences an inwardly directed pressure force as soon as it is gripped from the outside. It may either oppose this force itself, when it is situated on a solid body which passes through up to a mirror-image contact surface on its oppositely situated end-face side, since in this case the two radially inwardly directed pressure forces maintain an equilibrium and mutually compensate for one another. Or, a type of indentation is present behind this contact surface, in which a protrusion engages on the adjustable articulated part and then supports the first contact surface on its rear side.

Particular advantages result from a design in which the rotation axis or articulated axis does not pass perpendicularly through the undercut or contact surface which is enclosable or contactable by the adjustable articulated element at or in the vicinity of the end(s) of one, two, multiple, or all radial widenings of the arc-shaped depression, but, rather, the undercut or contact surface seeks to move outwardly toward the peripheral end of the radial widening in question in the longitudinal direction thereof, i.e., toward the next closest end-side face of the housing. In this way, contact with the undercut or contact surface may be established, and the contact may be released, by moving the adjustable part in the longitudinal direction of the radial widening in question.

According to another design requirement, the perpendicular to the undercut or contact surface which is enclosable or contactable by the adjustable articulated element encloses an angle, at or in the vicinity of the end of a radial widening of the arc-shaped depression, with the rotation axis or articulated axis that is greater than or equal to 2°, preferably greater than or equal to 5°, in particular greater than or equal to 10°. Too small an angle would require a relatively great movement of the adjustable body in the longitudinal direction of the widening in question in order to exert a sufficient pressing force against the wedge-shaped inclined undercut or contact surface.

On the other hand, it should be ensured that the perpendicular to the undercut or contact surface which is enclosable or contactable by the adjustable articulated element encloses an angle, at or in the vicinity of the end of a radial widening of the arc-shaped depression, with the rotation axis or articulated axis that is less than or equal to 45°, preferably less than or equal to 30°, in particular less than or equal to 20°. In the case of an angle that is too large, no appreciable increase in force occurs, but, rather, only a deflection of force occurs. Therefore, the force to be applied by an operator would have to correspond approximately to the magnitude of the locking force, which is not to be reasonably expected of a young mother.

Within the scope of the invention, a counterpart for each undercut or contact surface which is enclosable or contactable is provided on the adjustable articulated element in the area of one or preferably both end-side faces of the housing. This requires that the largest possible area of contact with the undercut or contact surface be established. For this purpose, it is beneficial for the counterpart to have a design which in the area of its contact surface with the undercut or contact surface is as natural a complement to the latter as possible.

In line with this concept, the invention further provides that a counterpart of the adjustable articulated element is designed as a surface that is in parallel to the undercut or contact surface in question which is enclosable or contactable by same. As the result of a linear displacement of the adjustable part, the contact surfaces provided for this purpose come into large-surface contact with one another.

The design acquires an advantageous force symmetry when, on the adjustable articulated part in the area of both end-face sides of the housing, a surface that is in parallel to each undercut or contact surface at that location is provided. The axial force components of both surface contacts then compensate for one another and do not have to be diverted, thus simplifying the design.

The radial adjustment of the adjustable articulated element may preferably be brought about by means of a mechanism, in particular by means of a rod assembly, that may be subjected to tensile and compressive load. Oppositely directed movements, i.e., the locking movement on the one hand and the reverse release movement on the other hand, may be transmitted via tension and compression.

To protect a mechanism or a rod assembly, which may be subjected to tensile and compressive load, from external influences, it should be accommodated within a hollow bar or side leg of the push bar. The locking or release movement may be relayed within this bar or hollow profile.

In particular, an element of the mechanism or the rod assembly which may be subjected to tensile and compressive load may be coupled to an actuating element in the upper area of the particular bar or side leg of the push bar. Actuation of the locking from the push bar is thus conveniently possible.

An element of the mechanism or the rod assembly which may be subjected to tensile and compressive load is suitable not only for manual actuation, but also for automatic engagement. For this purpose, the element may be pretensioned via a spring element that is supported on the particular bar or side leg of the push bar. In this way, the engagement operation is automatically triggered as soon as the adjustable part encounters a radial widening. The reverse disengagement movement must then be made manually by a reverse displacement of the engaged part under tension of the spring for the next engagement movement.

Due to a front wheel strut, a rear wheel strut, and/or a leg of the push bar lying in a shared plane, all forces may be transmitted within a shared plane, thus improving the stability of the chassis.

Within the scope of the invention, for releasing the locking of an articulated joint of the chassis, in particular between the connection for a front or rear wheel strut on the one hand and the housing of the joint on the other hand, a two-arm lever or a rocker is provided which is pressed against a circumferential area of an adjustable articulated part under the influence of at least one spring element, and which at a certain angular position pulls a movable locking bolt in the direction of the axis of the adjustable articulated part, thus releasing the front or rear wheel strut in question so that the chassis may be folded up.

Further advantages result from the fact that an adapter is integrated into or fixed or fixable to a joint, and various attachments such as infant carriers, sport or stroller seats, carriers similar to reclining seats, etc., may be mounted on the chassis of the baby carriage. Various attachments are thus replaceable with one another and may be adapted to the body size as the child grows older.

One possible attachment includes a U-shaped bar with two side legs connected by a central crosspiece. For example, the side parts of a canopy may be fixed thereto, in particular via joints which allow the canopy to be folded out and folded in. While the seat back of the attachment is preferably fixed to the central crosspiece of the top U-shaped bar, the canopy should be pivotable toward the front above the seat back. This is facilitated by multiple U-shaped bent ribs whose free ends meet at separate articulation points, which in turn are situated on each of the two side legs of the U-shaped bar.

Lastly, according to the teaching of the invention, an attachment has a folding frame for the canopy which is fixable to an adapter of the chassis and is not mechanically connected to further frame parts of the sitting surface of the attachment, but instead, the frame parts of the sitting surface of the attachment are suspended, if necessary, on the folding frame for the canopy via the (cover) material of the attachment. This method of a complete division of the attachment frame into an upper area for supporting the seat back and the canopy, and a completely separate part for supporting the sitting surface, has the advantage that as a result the chassis has only a single articulated axis, and may thus be easily folded up to a very small size.

BRIEF DESCRIPTION OF THE DRAWINGS

Further features, particulars, advantages, and effects based on the invention result from the following description of one preferred embodiment of the invention and with reference to the drawings, which show the following:

FIG. 7b shows the rigid element from FIG. 7a in a perspective view, partially cut away;

FIG. 7c shows the rigid element from FIGS. 7a and 7b in a perspective exploded illustration;

FIG. 26 shows an illustration of the joint in the state according to FIG. 16, where the angle α between the perpendicular onto the contact surface and the rotation axis is shown.

DETAILED DESCRIPTION OF THE PREFERRED EMBODIMENTS

Figure 1:
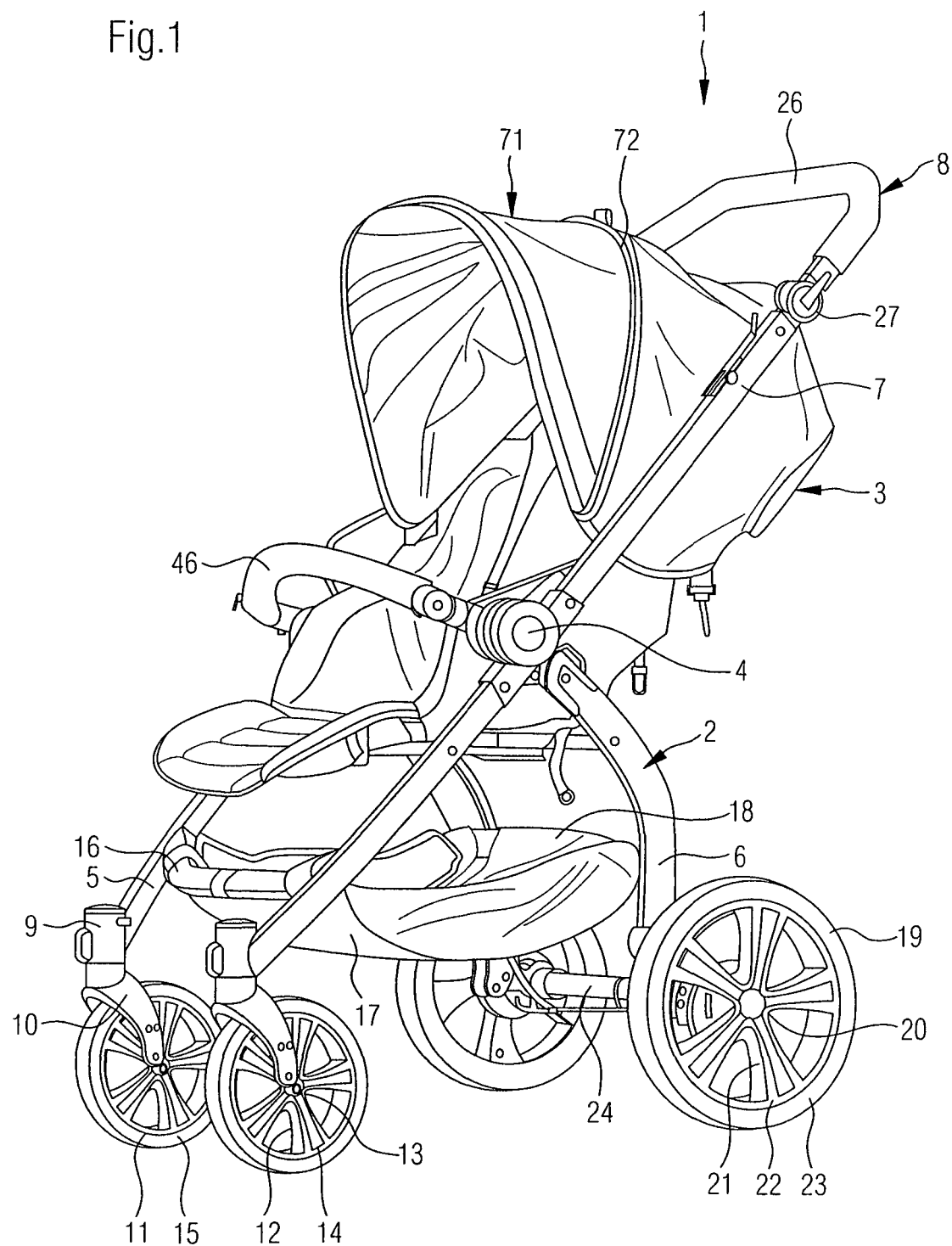
FIG. 1 shows a baby carriage according to the invention in a perspective view, with the child sitting with a view in the travel direction.
Figure 2:
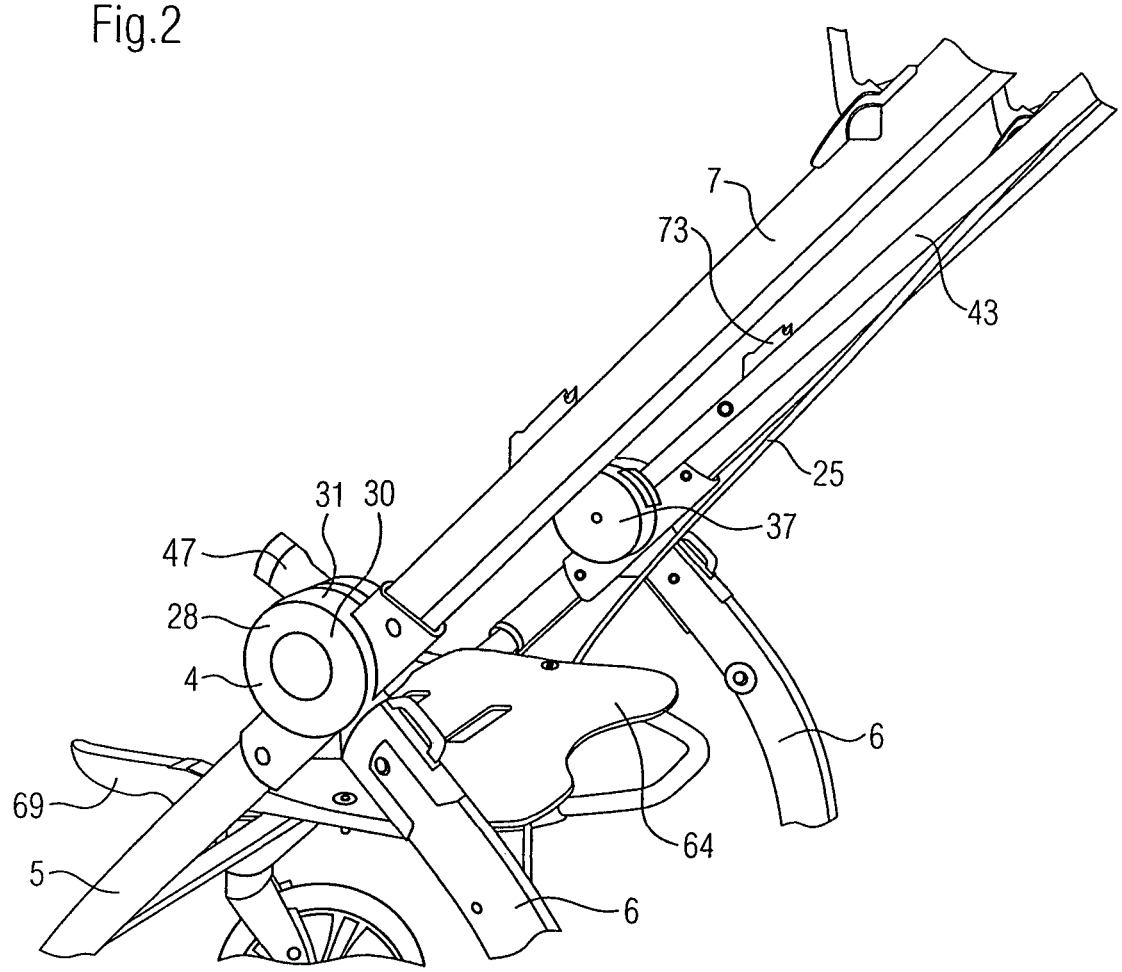
FIG. 2 shows a detail of the baby carriage according to FIG. 1 with the attachment removed, likewise in a perspective view.
Figure 3:
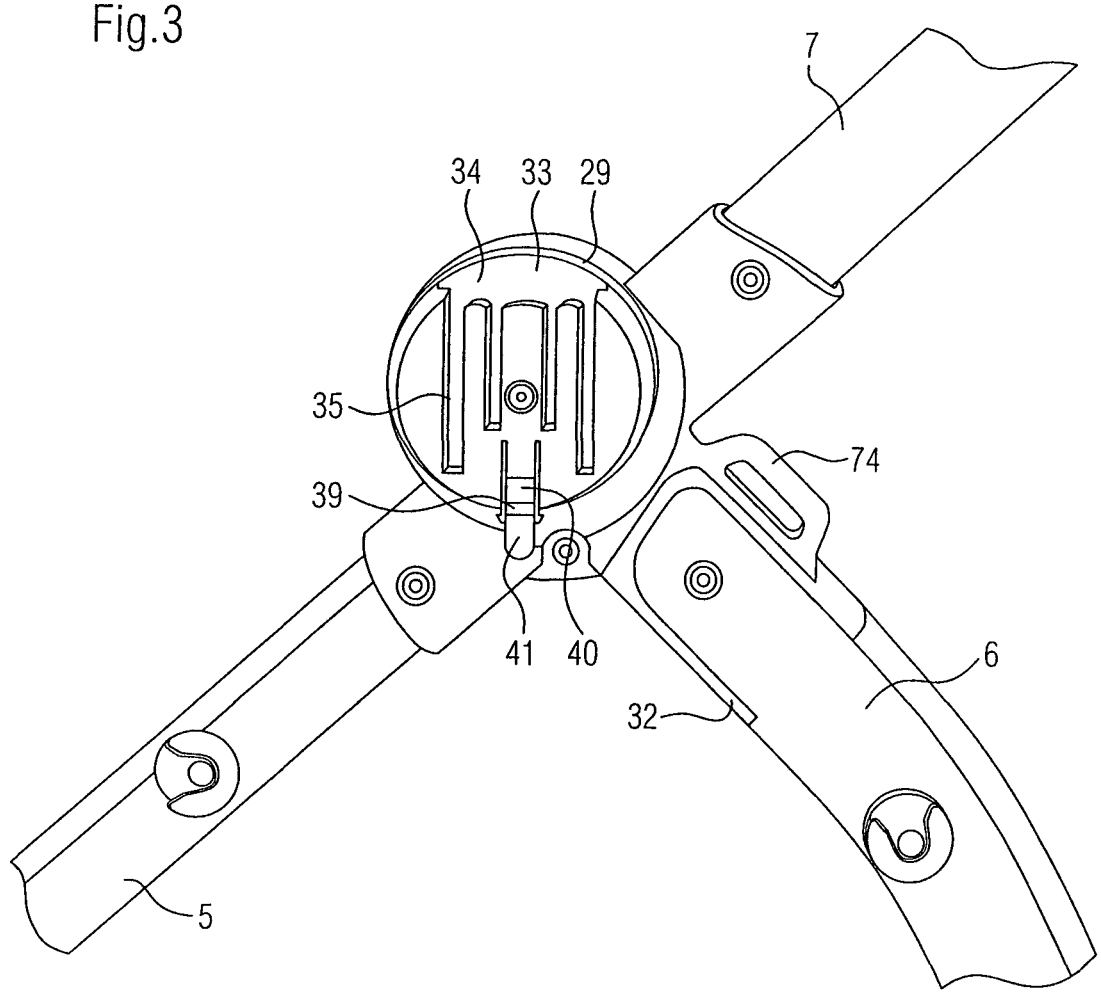
FIG. 3 shows a detail of a pivot frame of the chassis of the baby carriage according to FIGS. 1 and 2, with an option for affixing an attachment.

The baby carriage 1 depicted in the drawing is designed in such a way that it may be folded up and unfolded; in the unfolded state it is particularly easy to handle, and in the folded-up state takes up very little space. The particular configuration of the chassis 2 as well as the particular structure of the attachment 3 contribute in this regard.

The chassis 2 has a symmetrical design with respect to a vertical center plane that is parallel to the travel direction. Key components of the chassis 2 are two joints 4, in each case situated at the sides, which are not directly connected to one another.

Both joints have the same design, but preferably are mirror images of one another. There are connections in each case to at least four elements: to each of two struts of the chassis 2, namely, a front wheel strut 5 and a rear wheel strut 6, to the attachment 3, and to each side leg 7 of a push bar 8.

Each front wheel strut 5 preferably leads to a front wheel 11 that is steerable in a rotary joint 9 about a vertical axis and rotatably supported in a fork-shaped holder 10; the rim 14 of the front wheel, which is connected to the wheel hub 13 via spokes 12, may be provided with a tire 15 made of hard rubber, for example. Since, due to the fork-shaped holder 10, the wheel hub 13 is set back toward the rear with respect to the rotary joint 9 in the horizontal direction, this results in trailing which controls the automatic steering of the front wheel 11 in question.

The front wheel struts 5 are preferably not connected to one another, or are connected only by a strut 16, extending only at approximately mid-height or in the lower area, transversely with respect to the travel direction, for suspending a transport basket or a flexible, trough-shaped fitted transport mat 17, which is also suspended on a second strut 18, which connects the two rear wheel struts 6 at approximately the same height.

While the front wheel struts 5 preferably extend straight ahead, or possibly are also bent slightly inwardly at the bottom to allow the baby carriage 1 to be steered more easily through narrow passages, the rear wheel struts 6 may extend in a plane parallel to the travel direction, but following an arching curve, so that in the upper area they extend downwardly and to the rear away from the joint 4, whereas in their lower area close to the rear wheels 19 they extend virtually perpendicularly, and are thus supported on the rear wheels 19 in an approximately vertical direction.

The rear wheels 19 preferably have a design that is similar to the front wheels 11, i.e., with a wheel hub 20, spokes 21 extending radially away from the wheel hub, and a rim 22, supported by the spokes, on which a tire 23, in particular made of hard rubber or in the form of an air-filled tire, etc., may be provided.

The same as for the front wheels 11, the rear wheels 19 may of course also be provided with pneumatic tires.

Unlike the front wheels 11, however, the rear wheels 19 are preferably not steerable. Instead, they rest on a shared axle 24 on which the two rear wheel struts 6 are each supported via suspensions in order to increase the riding comfort for a child.

In addition, a parking brake may be provided, which may be locked and/or released from the handle 26 of the push bar 8 via a Bowden cable 25, for example. Of course, a foot pedal or the like may also be provided for setting or releasing the brake.

Depending on the embodiment, the two rear wheels 19 may be supported separately from one another on an axle 24, in which case two braking devices are to be provided, or they are rigidly connected to a rotatably supported axle 24, so that only a single braking device which acts on this axle 24 is necessary.

The handle 26 of the push bar 8 may be pivotably connected to the upper ends of the side legs 7 of the push bar 8 via joints 27.

The housing 28 of each joint 4 is preferably connected to the front wheel strut 5 in question, i.e., is not rotatable with respect to same.

The housing 28 of the joint 4 has a substantially approximately cylindrical structure, with an inner end-face side 29 facing the attachment 3 and an outer end-face side 30 facing away from this attachment 3; a lateral surface 31 is situated in between. A protrusion 32 extends laterally away from this lateral surface 31.

The connection for the push bar 8 is situated on the lateral surface 31 of the cylindrical shell-shaped housing main section, while the rear wheel strut 6 extends away from the lateral protrusion 32.

The connector 33 for the attachment 3 is situated on the interior end-face side 29. This connector has the shape of a flat disk 34 in which at least one, preferably multiple, in particular two or three or four or five or six, slots 35, which in each case are parallel to one another, are present.

The disk 34 with its rear side is nonrotatably and/or immovably fixed to the inner end-face side 29 of the joint housing 28, or thus integrated therein, in particular in such a way that the flat sides 36, provided with the slots 35, of both disks 34, one situated on each joint 4, face one another.

The disks 34 are oriented in such a way that the slots 35 all extend in the vertical direction or predominantly in the vertical direction. These slots each have an upper end and a lower end. Whereas the lower ends are closed, so that the slot 35 in question ends bluntly at that location, the upper ends of the slots 35 are open, so that web elements 36 may be pushed in from there.

This is important due to the fact that the slots 35 as well as the webs 36 that are insertable therein do not have rectangular cross sections, but instead are undercut, for example in the manner of a dovetail connection, or in which the cross sections taper with a step-like cross section, so that in each case a widened web section in the area of a free longitudinal side of the web 36 cooperates with a slot section that is widened in the base of the grooved slot 35, while the slot cross section which is tapered toward its opening cooperates with a tapered web cross section close to its base. For this reason, the webs 36 cannot be detached from the slots 35 in the horizontal direction, but instead can be detached only upwardly in the vertical direction while overcoming the oppositely directed, downwardly acting weight force of the attachment 3.

Figure 4:
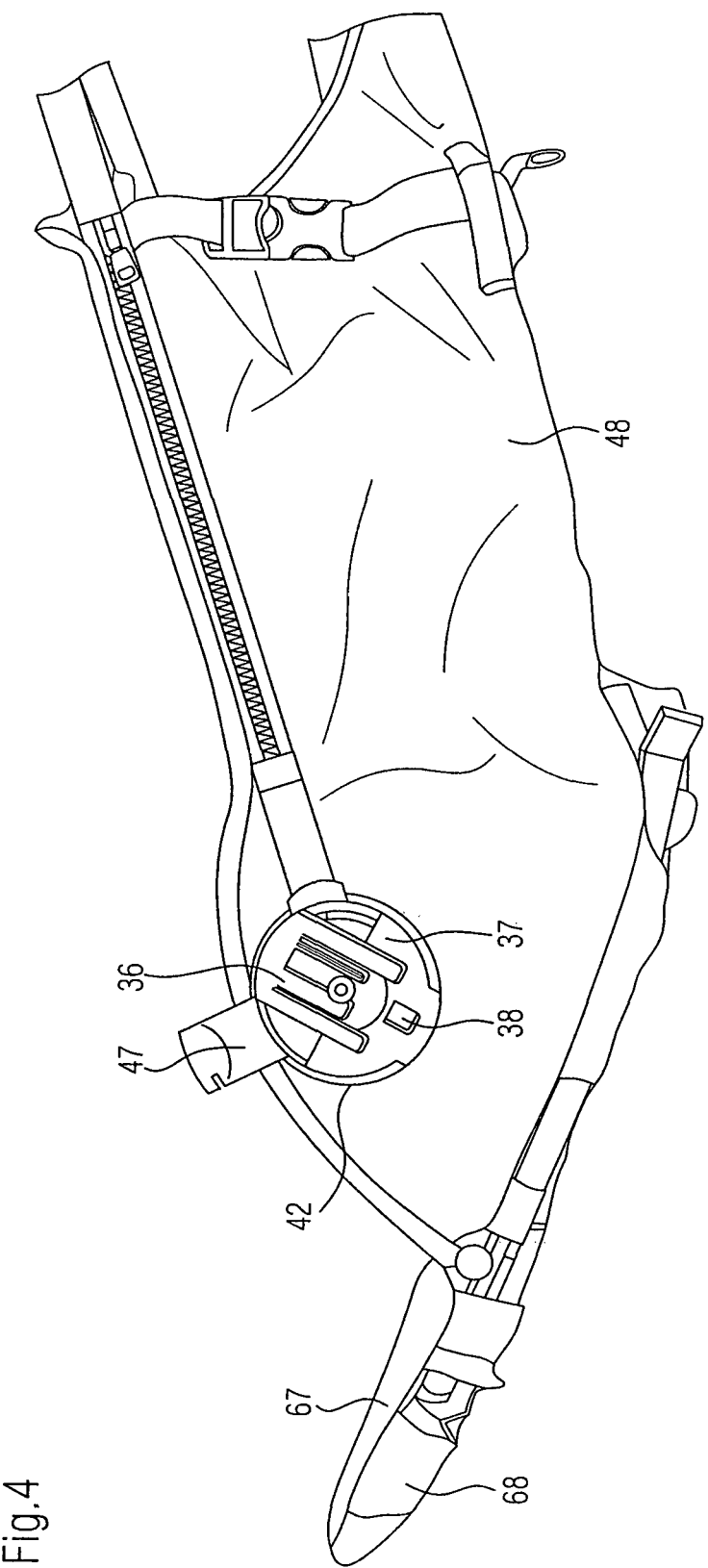
FIG. 4 shows a side view of an attachment for fixing to the baby carriage chassis according to FIG. 3, in a partially cut-away illustration.

As is apparent in FIG. 4, the webs 36 are situated and thus combined on a disk 37, which bears the attachment 3.

It is also apparent that the arrangement of the slots 35 as well as the arrangement of the webs 36 on the particular disk 34, 37 which are insertable into the slots are symmetrical with respect to a centerline. As a result, the attachment 3, which has a disk 37 on each side, is suspendable on the chassis 2 of the baby carriage 1, also in a state that is rotated by 180° about an axis in parallel to the slots 35 or webs 36. This allows the attachment 3 to be mounted on the chassis 2 in the travel direction or also opposite the travel direction.

Unintentional release of the attachment 3 from the chassis 2 is practically ruled out due to the force of gravity alone. However, the invention additionally provides locking, which includes a recess or depression 38 in one of the two disks 34, 37 and a protrusion 39 on the respective other disk 37, 34 which can spring back, for example by being situated on a tongue 40 which is partially cut away from the surrounding disk 34, 37 by lateral slots.

When the protrusion 39 is engaged in the depression 38, the elastic tongue 40 holds it in this state, thus ensuring that the attachment 3 can no longer be lifted upwardly out of the holder slots 35.

To allow the attachment 3 to now be released from the chassis 2, a tab 41 which protrudes beyond the edge of the disk 34, 37 in question is provided, for example integrally molded, on the free end of the tongue 40. This protruding tab 41 is also accessible from the outside, even when the disks 34, 37 adjoin one another, and may be bent away from the respective other disk until the protrusion 39 of the tongue 40 is released from the depression 38, thus allowing the attachment 3 to be removed at the top. Of course, the arrangement of the slots 35 and webs 36 may also be reversed; i.e., the disks 34 on the chassis side then have webs which engage with slots in the disks 37 on the attachment side.

It is also apparent from the illustration according to FIG. 4 that the disks 37 on the attachment side have the same circumferential shape as the disks 34 on the chassis side.

The disks 37 on the attachment side and/or the disks 34 on the chassis side preferably have a circular base surface, i.e., a circular or cylindrical lateral surface 42.

Figure 7A:
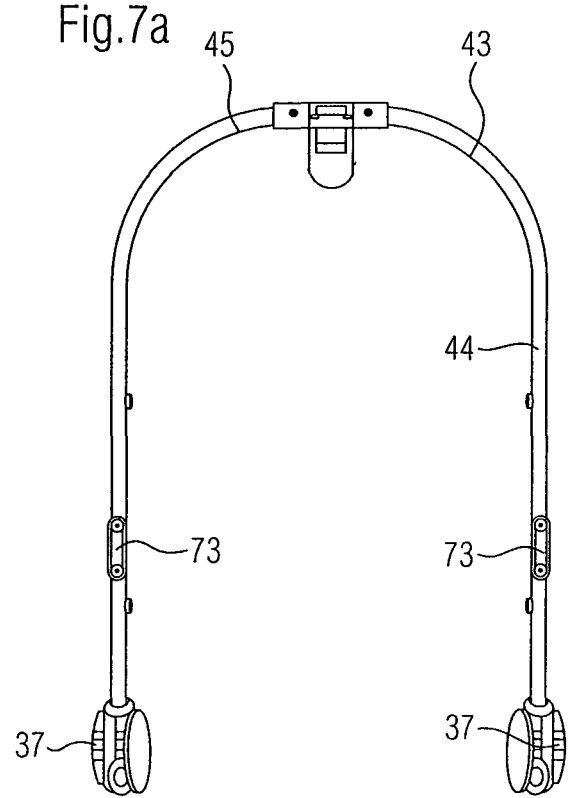
FIG. 7a shows another, preferably rigid, element of an attachment that is fixable to the baby carriage according to FIGS. 1 to 3, in a front view.
Figure 8:
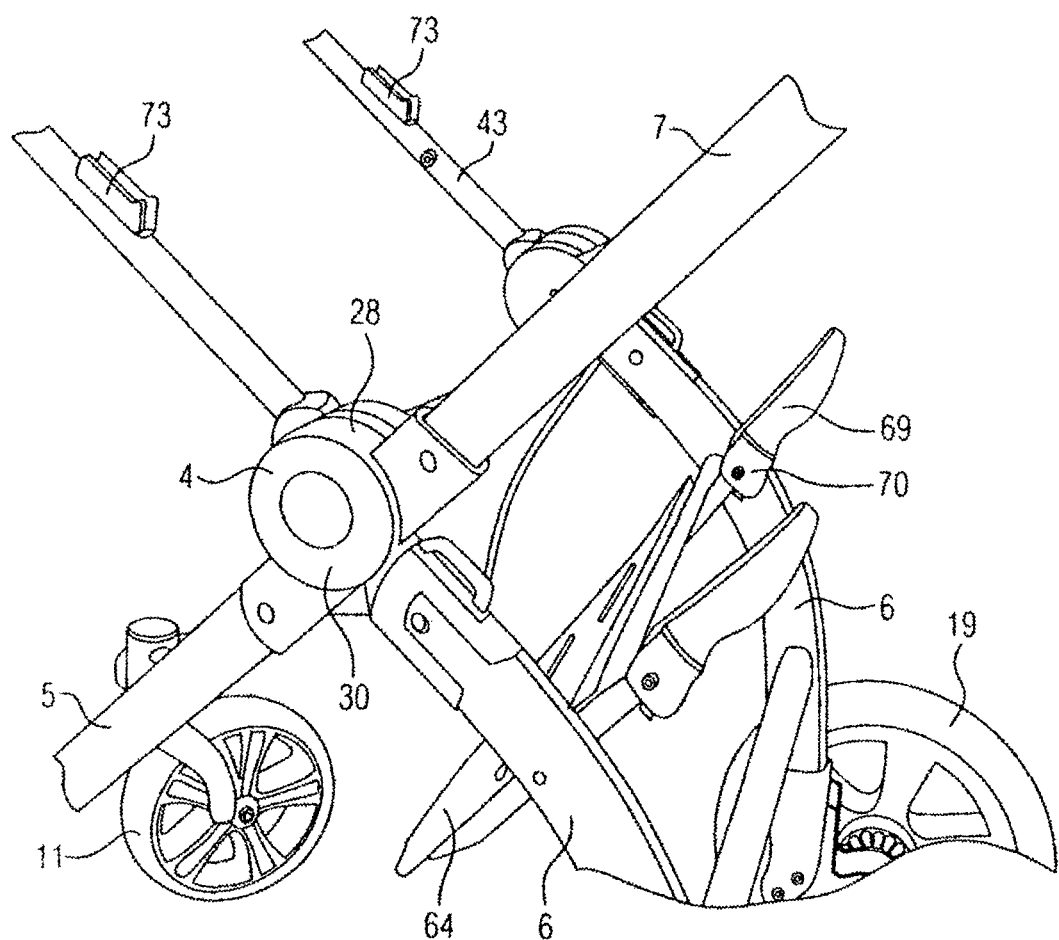
FIG. 8 shows a view, approximately corresponding to FIG. 2, of frame parts of the baby carriage according to FIGS. 1 to 3, the frame being adjusted in such a way that when the attachment is completely mounted thereon, the child is not looking in the travel direction, but, rather, has visual contact with a person pushing the baby carriage.
Figure 9:
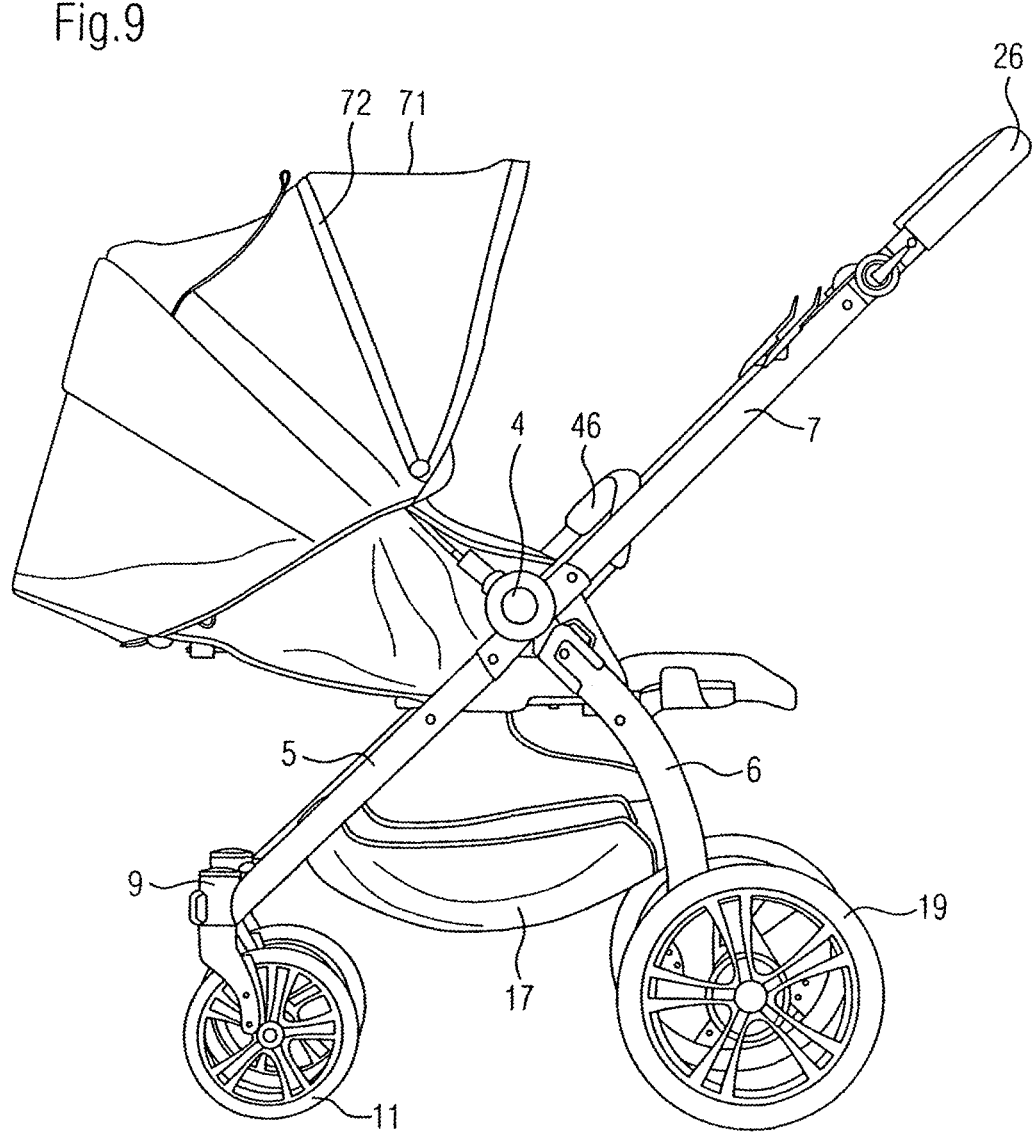
FIG. 9 shows a side view of the completely mounted attachment in the position according to FIG. 8.

Fastened to the disks 37 on the attachment side, in particular at their lateral surfaces 42, is at least one bearing element of the attachment 3, in particular a bar 43 having a U-shaped curve, i.e., with two mutually parallel side legs 44 that are connected to one another at their ends facing away from the disks 37 by an end-side crosspiece 45. The bar 43 is depicted in detail in FIGS. 7*a* through 7*c*.

It is apparent that the side legs 44 of the bar 43 extend radially away from the lateral surfaces 42 of the disks 37.

On the other hand, the side legs 44 of the bar 43 in the use state extend not in parallel to the webs 36 or slots 35 of the disk 37 on the attachment side, but, rather, at an angle in the approximate range of 45°. The bar 43 in the inserted and arrested or locked state thus protrudes upwardly at such an angle of approximately 45°, either in the travel direction or opposite the travel direction, depending on the orientation with which the attachment 3 has been mounted on the chassis 2.

In addition, a waist bar 46 which prevents the child from standing up may also be connected to the disks 37 of the attachment 3, which are used as an adapter. Such a waist bar 46 is preferably removable. It may also have a U-shaped curve, so that its leg ends are insertable into sleeves 47, each of which is connected to an adapter disk 37.

The waist bar 46 in the use state preferably does not extend in the same plane as the support bar 43 for the attachment 3. Rather, the two bars 43, 46 may enclose an intermediate angle of approximately 60° to 150°; in the illustrated example, this angle is approximately 100°. The direction of the slots 35 or webs 36 at the disk 37 in question is between these two bar planes, preferably approximately centrally in between, as is apparent in FIG. 4.

FIG. 4 depicts the use position of the two bars 43, 47. However, since this use position has proven to be relatively cumbersome for some situations, for example for transporting the baby carriage in a vehicle trunk or the like, it is provided according to the invention that both bars 43, 37 are independently rotatably adjustable with respect to the disks 37. In particular, one or preferably both bars 43, 37 are pivotable from the use position in both directions of rotation, so that, regardless of the position of the push bar 8, in each case a space-saving configuration of the two bars 43, 47, for example in the direction of the push bar 8, may be occupied.

The locking mechanisms 116 used for the two bars are situated in each of the disks 37 on the attachment side, and are clearly visible in FIGS. 7*b* and 7*c*; in addition, in FIG. 7*b* the support bar 43 is illustrated cut open along its length so that its inner workings are also discernible. The locking mechanisms 116 are jointly controlled by an actuating element 117 in the area of the crosspiece or the vertex 118 between the two side legs 44 of the support bar 43. The actuating element 117 includes a sleeve 119 which encloses the support bar 43, preferably with a radially protruding tab 120. The sleeve 119 is guided in the longitudinal direction of the support bar 43 in an area 121 that is recessed in the manner of a trough, and therefore can be pivoted only about the support bar 43.

The sleeve 119, which for purposes of mounting is divided into two half-shells 123 that are closed around the support bar 43, has two helical depressions 124 on its inner side 122 which, however, have different orientations. The two depressions 124 are each made up of two sections, one of which is situated on the upper half-shell 123, and the other, on the lower half-shell 123. The depressions in the same half-shell follow different curves: one is right-handed, and the other is left-handed. The two half-shells 123 at their inner sides 122 preferably have identical designs. Overall, there are thus a total of four screw threads 124 which enclose the support bar 43 by 180° in each case: two each on the upper half-shell 123 and two each on the lower half-shell 123.

Engaging in each of these two helical depressions 124 is a pin 125 which passes through the support bar 43 transversely with respect to its local longitudinal direction, and which is displaceable in an elongated hole 126 at that location, specifically in this local longitudinal direction, i.e., transversely with respect to the seating direction. The pins 125 in each case protrude with their two ends from the elongated hole 126, and each end engages with one of the four screw threads 124 of the sleeve 119. As a result, when the sleeve 119 is swiveled by approximately 180° by means of the screw threads 124, the two pins 125 are displaced in their elongated holes 126, in particular in opposite directions in each case, i.e., either both toward one another or both away from one another.

A pull wire or some other traction means 126 is fastened to each of the two pins 125, for example via a loop or eye 127 at one end of the traction means 126. The two traction means 126 extend inside the hollow support bar 43, away from the actuating element 117, through each side leg 44 of the support bar 43 to its free open end 128 in the area of a disk element 37.

The free open ends 128 of the side legs 44 of the support bar 43 are used as linear guides for each control element 129, which is accommodated therein and displaceable in the longitudinal direction of the side legs. The control element is provided with a transverse hole 130 in which a thickening element 131, which is cylindrical, for example, engages at the free end of the traction means 126 in order to transmit a tensile force, exerted by the actuating element 117 on the traction means 126, to the control element 129 and thus pull it into the particular open end 128 of a side leg 44 of the support bar 43. The reverse movement is produced by spring elements 132 that are coupled to the control element 129 and pretensioned in such a way that they seek to pull the control element out of the opening 128 as soon as a decreasing tensile force on the part of the actuating element 117 allows this.

In addition, at least one transverse pin 133, which is used for the actual rotary locking, passes through the control element 129.

The disk elements 37 are in each case made up of a type of housing 134 which is used for the connection to the disk 34, for example via the slots 35 at that location, in which webs 36 on the housing 134 may engage.

The housing 134 includes two plates 136 that are connected to one another by a web 135, a disk-shaped element 137 that is rotatable about a rotation axis 138 being accommodated between the plates, with the rotation axis 138 passing perpendicularly through the plates 136 of the housing 134.

In each slide position, the control element 129 partially protrudes into a type of channel within the disk-shaped element 137, thus indicating to the disk-shaped element its swivel position about the rotation axis 138. The transverse pin 133 protrudes from the disk-shaped element 137 at least on its side facing away from the adapter 34 on the chassis side. An arch-shaped depression 139 through which the transverse pin 133 passes is introduced into the disk 136 in question. At least one engagement widening 140, into which the transverse pin 133 can slide in the desired use swivel position under the influence of the spring elements 132, is situated in the edge of this arch-shaped depression 139.

Furthermore, for connecting the play bar 47 to the disk element 37, an additional ring-shaped element 141 is provided at that location, and extends on the outer side of the inner disk 135, in parallel with same. The ring-shaped element is likewise rotatably mounted on the rotation axis 139, and on its inner side has a rim-like circumferential edge 142 which projects toward the disk 139, which in turn has an outwardly directed trough-shaped depression 143 as an engagement widening at one location on its radially inward side.

Since the inner edge 142 has a larger radius than the radially outer edge of the arch-shaped depression 139 in the disk 136, when the transverse pin 133 is removed from the engagement depressions 139, 143, initially the play bar 47 is freed, and only afterwards is the support bar 43 freed. Conversely, the support bar 43 is initially engaged, then the play bar 47.

The actual seat shell 48 of the attachment 3 is fastened to the two side legs 44 of the support bar 43 and also to its crosspiece 45.

Figure 5:
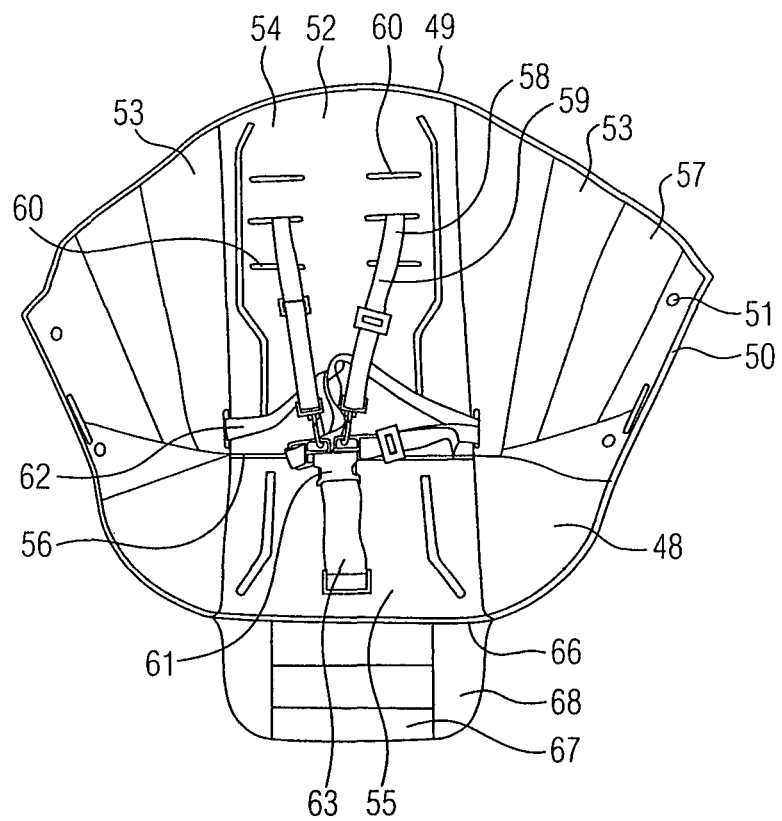
FIG. 5 shows a preferably flexible element of an attachment that is fixable to the baby carriage according to FIGS. 1 to 3.
Figure 6:
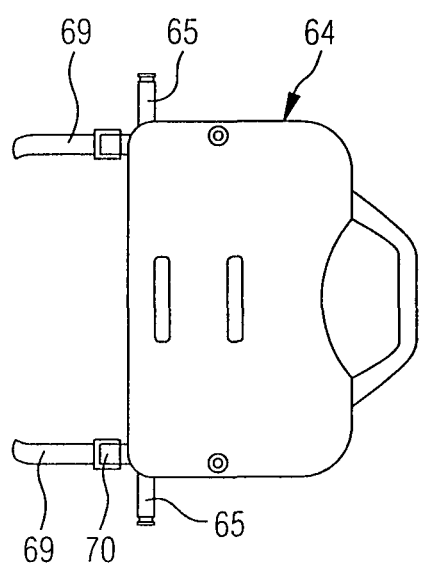
FIG. 6 shows another, preferably rigid, optionally adjustable element of an attachment that is fixable to the baby carriage according to FIGS. 1 to 3.

The seat shell 48, illustrated in FIG. 5, is made up primarily of a flexible material, and is thus optimally adapted to the shape and position of the child in each case. The seat shell in its upper area 49 is fixed to the crosspiece 45, and in the area of its two side edges 50 is fixed to each of the two side legs 44 of the support bar 43, for example in that it has lug-like areas or projections that are looped around the particular bar 44, 45 of the support bar 43 and are then connected to themselves, for example by means of push snaps 51.

As is also apparent in FIG. 5, the seat shell 48 is divided into a central middle area 52 and two edge areas 53 adjoining it on the sides.

The middle area 52 is divided into an upper area which is used as a seat back 54 for the child, and a lower area which is intended as a sitting surface 55. The sitting surface 55 is preferably smaller than the seat back 54, although both have approximately the same width.

At the level of the transition area 56 between the sitting surface 55 and the seat back 54, in each case wedge-shaped, outwardly widening areas may be cut out in the edge areas 53, so that after the edges of the cut-out area are sewn together, the shape of a seat shell 48 more or less automatically results. The edge areas 53 function as arm rests or side supports 57.

Belts 58 for restraining a child may also be provided in the middle area 52; for example, shoulder belts 59 may emerge toward the front at slots 60 in the seat back 54 and be connected via a belt buckle 61 to waist belts 62, or to a lower belt 63 which extends centrally through the section.

In order for the child to not sit in the seat shell in the manner of a hammock, a flat sitting surface support 64 made of a strong material is provided beneath the sitting surface 55. The sitting surface support is preferably fixed to each of the front chassis struts 5, 6 in the viewing direction of the child, for example by inserting or introducing laterally protruding projections 65 into bushings or the like that are fixed to the chassis struts 5, 6.

The seat shell 48 rests only loosely with its sitting surface 55 on the plate-shaped sitting surface support 64. In particular, the sitting surface support 64 is not connected to the support bar 43.

At the front, a lower leg flap 67, preferably likewise made of a flexible material, is suspended at the front edge 66 of the sitting surface 55. The lower leg flap may have two lateral pockets 68 on its bottom side which extend along the side edges of the lower leg flap 67 and are open at the rear, i.e., in the area of the front edge 66.

These pockets 68 are used for accommodating one lower leg support 69 each.

Each of these lower leg supports 69 has the shape of a short rod or stub, which at its rear area is connected to the solid sitting surface support 64 via a joint 70 at that location.

As soon as the lower leg supports 69 are inserted into the pockets 68 of the lower leg flap 67, they determine its shape: If the lower leg supports 69 are directed toward the front, approximately horizontally in the viewing direction, as shown in FIG. 4, the lower leg flap 67 stretches out between the lower leg supports like a horizontal sail, for example, and may be used to support a small child's lower legs.

For larger children, the lower leg supports 69 are bent down approximately vertically at their joints 70 and carry the lower leg flap 67 along with them. A larger child may now be seated on the attachment 3 and place the lower legs at the bottom in the customary sitting position.

Another special feature of the attachment 3 is a canopy 71. The canopy is likewise made of a flexible material which is stretched out on a plurality of rib-shaped canopy bars 72 that span above the seat.

The canopy bars 72 each follow a U-shaped curve. The ends of their side legs meet at each side of the baby carriage 1 at separate joints that are fixable to preconfigured fastening areas 73 of the side legs 44 of the support bar 43.

Since most of the components of the attachment are thus connected to the adapter disk 37 via the support bar 43, if necessary they may be removed as a whole and remounted in the opposite viewing direction.

In addition, it is necessary only to remove the solid sitting surface support 64, which is preferably integrated with the lower leg supports 69 to form a structural unit, and subsequently refasten it to each of the chassis struts 5, 6, at the front in the viewing direction.

However, the child must temporarily get up from or be removed from the seat, since otherwise the modification could be somewhat strenuous. If a mother wants to only briefly change the viewing direction of her child, for example because the child is crying loudly without visual contact with the mother, the baby carriage according to the invention additionally provides the option for swiveling the push bar 8 instead of the attachment 3 into a different position, so that it is not the viewing direction of the child, but, rather, the pushing direction by the mother, that is interchanged.

Figure 10:
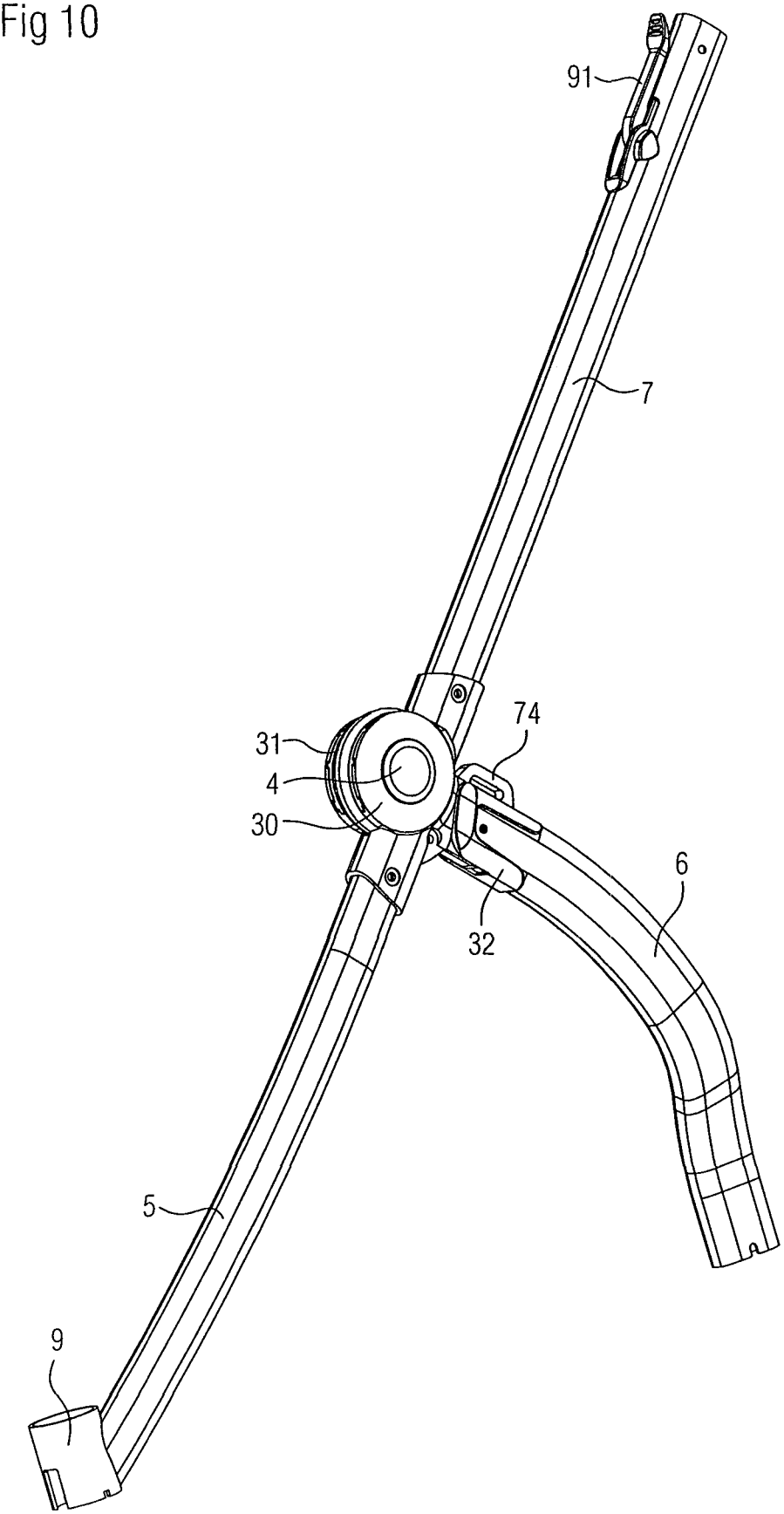
FIG. 10 shows a joint of the baby carriage frame according to FIGS. 1 to 3 or 8 and 9, with two chassis struts connected thereto and a bar of the push bar which likewise diverges away from same.

This is carried out by the joint 4 according to the invention. The joint is illustrated more clearly in FIG. 10 and subsequent figures. In particular, the inner structure of the joint is apparent from FIG. 11.

In the illustrated embodiment, the housing 28 of a joint 4 is fixed to a strut of the chassis 2—in the drawing, to a front wheel strut 5.

A bushing-like connection for the front wheel strut 5 is apparent on the housing 28. The housing 28 of the joint may be integrated with this connection, for example manufactured by injection molding in a single work operation.

The housing 28 includes a portion of the lateral surface 31 and two end-face sides 29, 30. In addition, a protrusion 32 for hinging the rear wheel strut 6 is integrally molded onto the lateral surface 31. Furthermore, a securing eye 74 may thus be integrated so that the baby carriage may be anchored, for example in a traction means or the like, by means of a belt.

It is further apparent that rib-shaped elevations 75 are in each case integrally molded onto the inner sides of the two end-side faces 29, 30.

Counterparts thereto in the form of grooved depressions 76 are situated at the outer sides 77 of two inner articulated plates 78, which are anchorable from the inside to the housing end-face plates 29, 30 in such a way that the ribs 75 engage with the grooves 76 and thus prevent relative rotation. Of course, the position of the ribs 75 and grooves 76 may also be interchanged. The articulated plates 78 are manufactured separately from the housing end-face plates 29, 30 only for production-related reasons so that they may be demolded more easily. Due to the ribs 75 and grooves 76, however, an articulated plate 78 is rigidly and nonrotatably connected in each case to a housing end-face plate 29, 30, and due to the articulated axis that passes through both the housing end-face plates, is also nondisplaceably connected. The ribs 75 and grooves 76 may in each case have a dovetail-shaped undercut cross section so that the articulated plates 78 are also rigidly connected to the housing end-face plates 29, 30 in the axial direction.

As explained in greater detail below, a window-like recess 79 is provided in each articulated plate 78. The window-like recesses 79 of both articulated plates 78 are congruent. In fact, the articulated plates 78 have mirror-image symmetry with respect to a center plane of the joint 4 through which the rotation axis 80 of the joint 4 passes perpendicularly.

The two articulated plates 78 are spaced apart from one another, and accommodate a further disk-shaped part 81 between them which has a connector 82 for a side leg 7 of the push bar 8, for example with a protrusion 83 that engages with the open end of a hollow profile-shaped side leg 7 when fitted together with the push bar 8. These parts are connected to one another by a transverse pin or a screw 84 that passes transversely through the protrusion 83 and the side leg 7.

In addition, the disk-shaped part 81 has a window 85 that passes through between the two base surfaces of the disk-shaped part and also communicates with a cavity in the protrusion 83.

A locking element 86 is displaceably guided in the window 85.

At its end facing [away from] the protrusion 83, the locking element 86 is integrated into or connected to a rod assembly 87 which extends upwardly within the hollow side leg 7 of the push bar 8 and which is coupled to an actuating lever 91 via one or more connecting joints 88, 89 and a connecting lever 90.

The actuating lever 91 is pivotably supported on a pivot axis 92 which extends transversely with respect to the travel direction.

Figure 12:
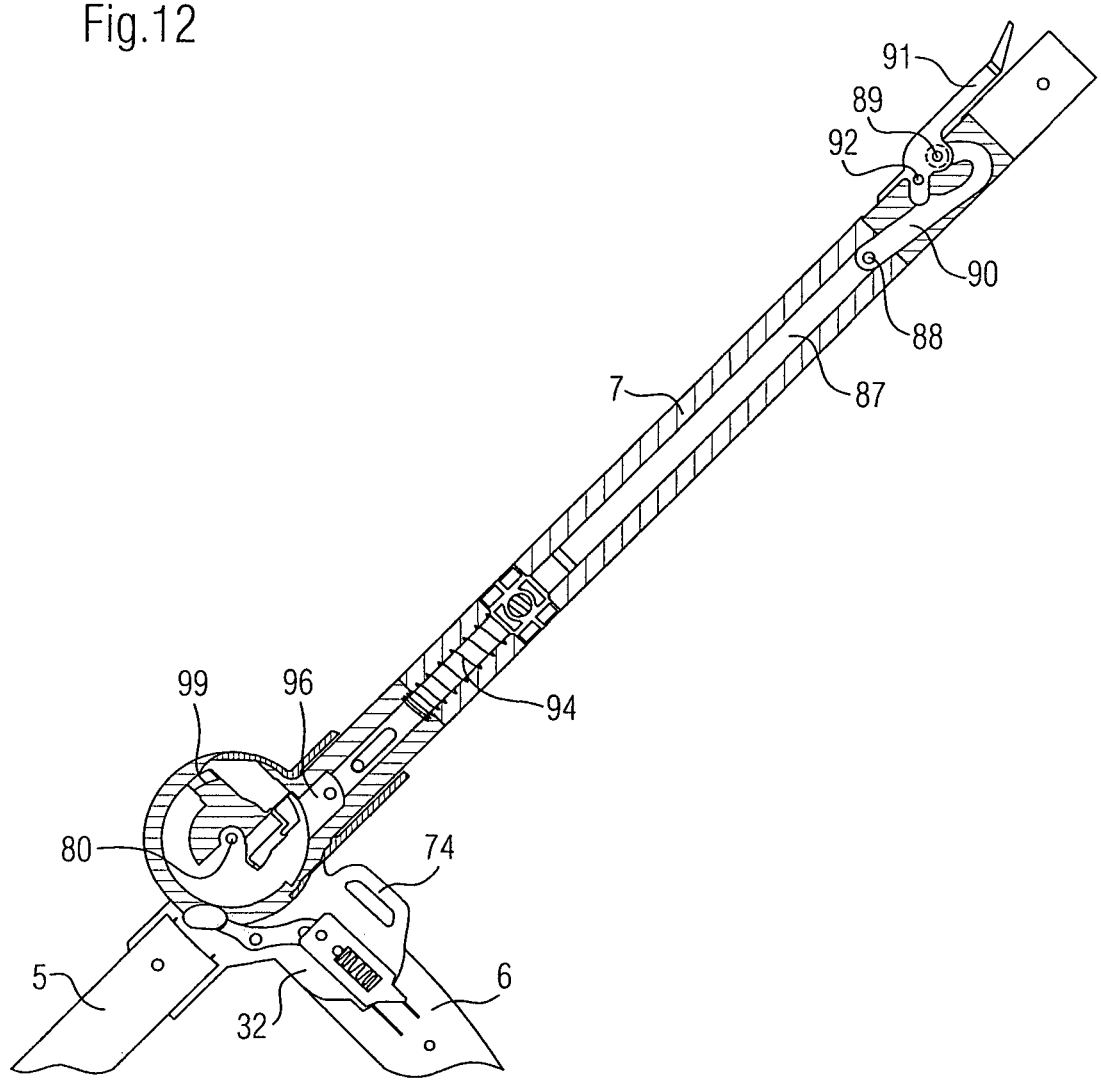
FIG. 12 shows a side view of the arrangement according to FIG. 10, partially cut away and partially in cross section, the joint being depicted in the completely locked state.
Figure 15:
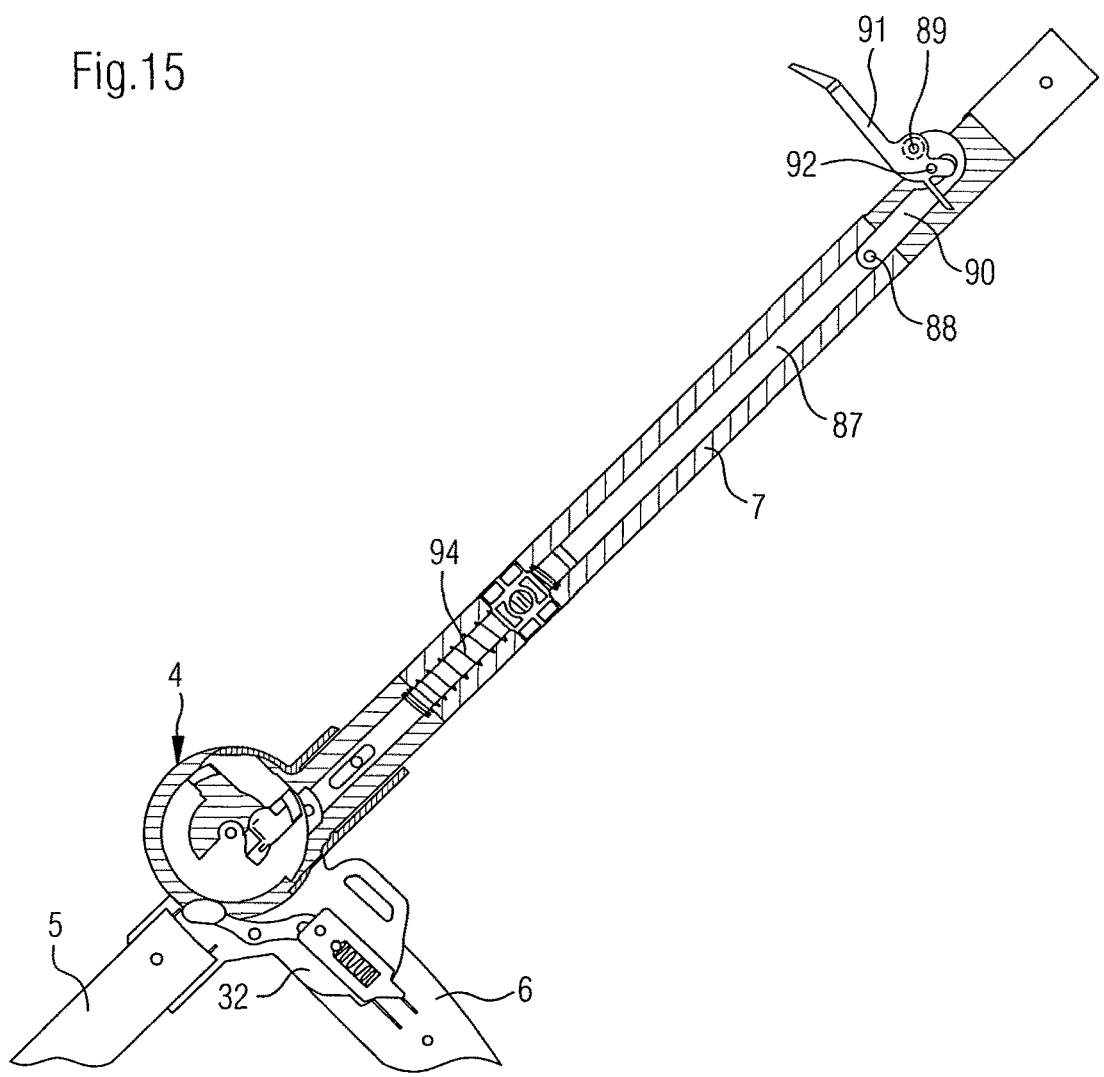
FIG. 15 shows the joint from FIG. 12 in an illustration corresponding to FIG. 13, in the unlocked but still engaged state.
Figure 17:
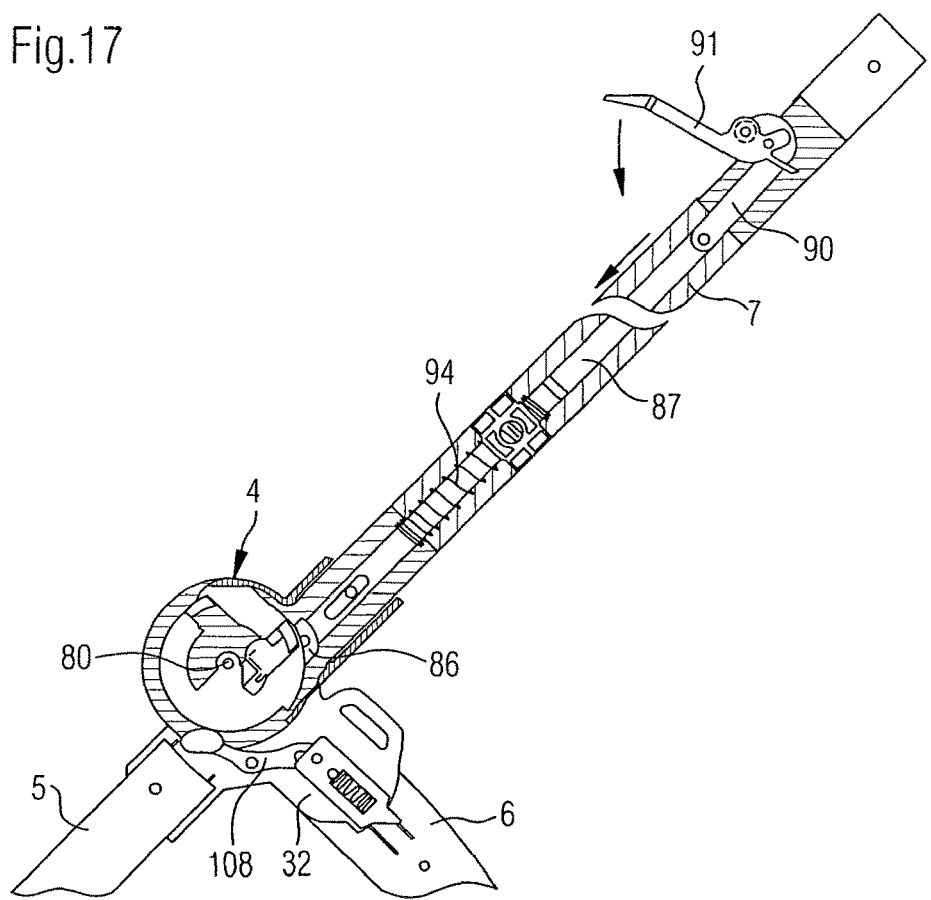
FIG. 17 shows the joint from FIG. 12 in an illustration corresponding to FIGS. 13 and 15, not only in the unlocked state, but also in the disengaged state.

In the present case, this actuating lever is a one-arm lever; the actuating handle 93 as well as the first connecting joint 89 for a connecting lever 90 are situated on the same side of the pivot axis 92. Accordingly, if the actuating handle 93 is swiveled upwardly toward the handle 26 of the push bar 8, as illustrated in FIG. 12, for example, the rod assembly 87 and thus also the locking element 86 move toward the handle 26 of the push bar 8, i.e., upwardly. On the one hand, if the actuating handle 93 is swiveled downwardly, as shown in FIG. 15 or 17, the rod assembly 87 and thus also the locking element 86 move toward the joint 4, i.e., downwardly.

A spring 94 that is coupled to the rod assembly 87, in particular a coil spring that encloses the rod assembly, is supported on the other side of the bar of the side leg 7 of the push bar 8, and due to pretensioning seeks to press the rod assembly 87 together with the locking lever 86 upwardly, if this is allowed by the actuating handle 93.

The window 85 in the disk-shaped part 81 has a predominantly longitudinal extension in the direction of the side leg 7 of the push bar 8, and thus allows the locking element 86 to move within the window 85 in the longitudinal direction of the rod assembly 87, under the influence of the spring 94 and the actuating handle 93. In contrast, rotation about the rotation axis 80 of the joint 4 is difficult or impossible.

The situation is different with the windows 79 in the two articulated plates 78. These windows have a predominantly arched design, i.e., an arc-shaped concentric curve with respect to the rotation axis 80 of the joint 4. Laterally protruding areas 95 of the locking element 86 are accommodated therein, while its body 96 is situated predominantly or solely within the window 85. This window 85 therefore takes on a guiding function for the locking element 86 with regard to the central disk-shaped articulated part 81.

In contrast, the windows 79 in the two articulated plates 78 determine whether the locking element 86 together with the disk-shaped articulated part 81 is able to move in the circumferential direction of the arch-shaped window 79.

This is because the arch-shaped windows 79, in addition to strictly arch-shaped edge sections, also have one or preferably two radial widenings 97 which extend outwardly from the arch-shaped window area 98 at various angles.

If the laterally protruding areas 95 of the locking element 86 are situated within such a radial widening 97, movement of the locking element 86, and thus of the disk-shaped articulated part 82 and the entire push bar 8, about the rotation axis 80 in the circumferential direction is not possible. However, if the laterally protruding areas 95 of the locking element 86 do not engage in any radial widenings 97, but, rather, are situated in the arch-shaped window area 98, movement within this window area 98, and thus pivoting of the push bar 8, is possible.

The lateral projections 95 together with the locking element 86 itself are moved upwardly by the spring 94 when they are situated directly opposite a radial widening 97 of the window 79. This is an automatic snap-in function which indicates to an operator that the correct position of the push bar 8 has been found.

However, the spring 94 does not have sufficient force to rigidly lock the joint 4 in this position. Rather, for this purpose the operator must manually pull the actuating lever 91 all the way up. The locking element 86 within the scope of its room for play within the window 79, 85 is thus pulled all the way up, or, with respect to the rotation axis 80, all the way radially outwardly.

In the process, the laterally protruding areas 95 of the locking element 86 are moved completely into the particular radial widening 97 of the window 79.

Figure 11:
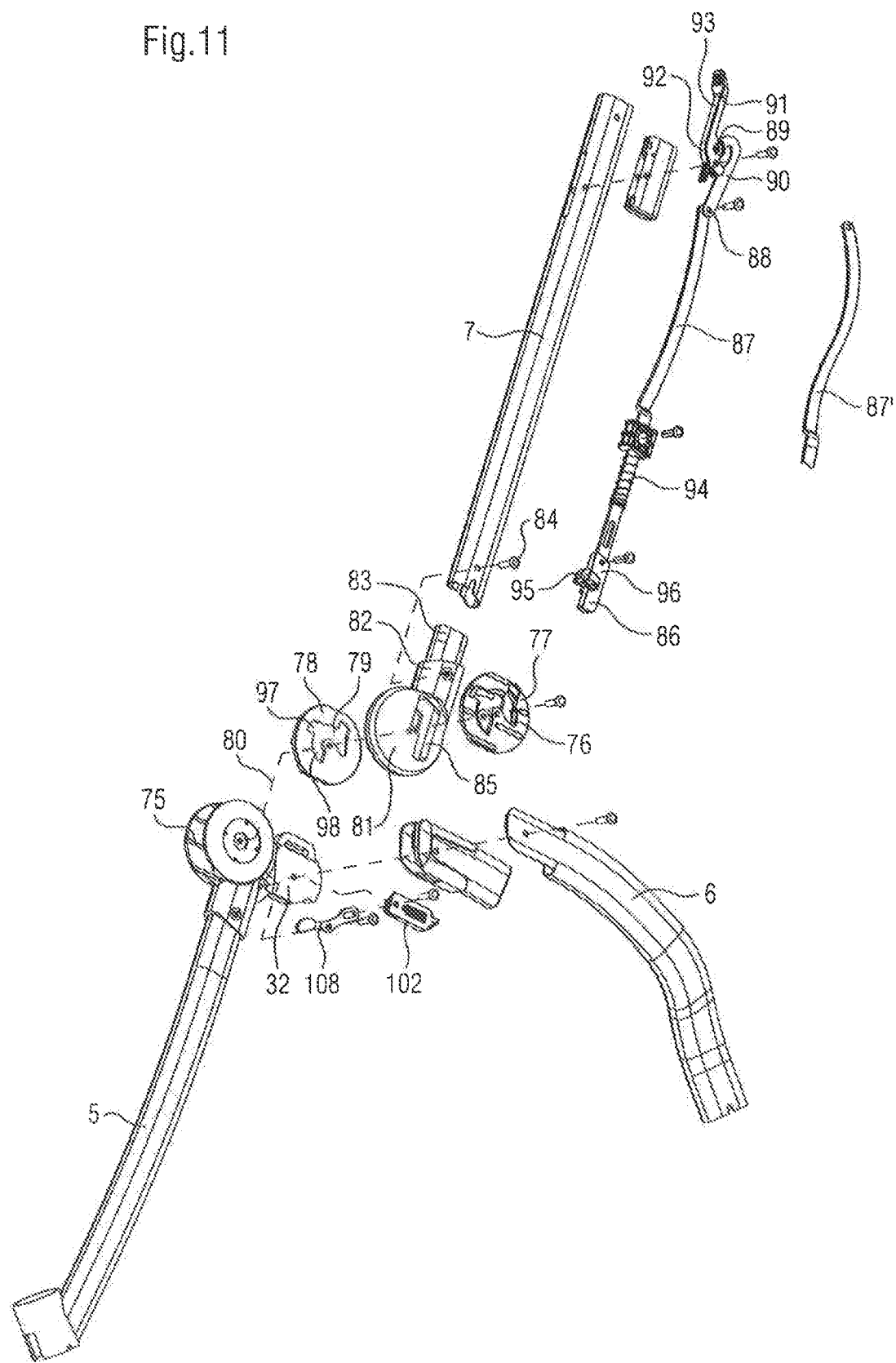
FIG. 11 shows an exploded illustration of the arrangement according to FIG. 10, so that the inner workings of the joint and of the bar of the push bar are discernible.

In order for the protruding areas 95 of the locking element 86 to not be moved too far into these widenings 97 of the window 79 due to manufacturing tolerances of the rod assembly 86, 87, 90 with respect to the bar 7, which could damage or destroy the lateral articulated plates 78, at least one rod 87 of the rod assembly 86, 87, 90 does not have a flat shape, but instead follows a slightly curved, arch-shaped progression, as shown in FIG. 11. As a result, the rod assembly 86, 87, 90 acquires a type of suspension capability in its longitudinal direction which allows the frontmost or bottommost part 86 together with its laterally protruding areas 95 to remain in the desired locked state, even if the actuating lever 93 has not yet reached its end position. The difference in length captures the curved, elastically flexible rod 87 of the rod assembly 86, 87, 90 due to the fact that this rod straightens out if necessary, thus becoming longer. Although this increases the clamping force that acts between the protruding areas 95 of the locking element 86 and the widenings 97 of the windows 79 in the lateral disks 78, the increase is only moderate, namely, an increase by the spring force of the elastically bent rod 87. The mechanism is able to bear this moderate increase in force without damage or even destruction. The bent rod 87 may be bent inwardly in an "(" shape or outwardly in a ")" shape, or—like the rod 87' which replaces rod 87—it may be bent to an "S" shape with an approximately central inflection point with two adjoining bends in opposite directions.

Figure 13:
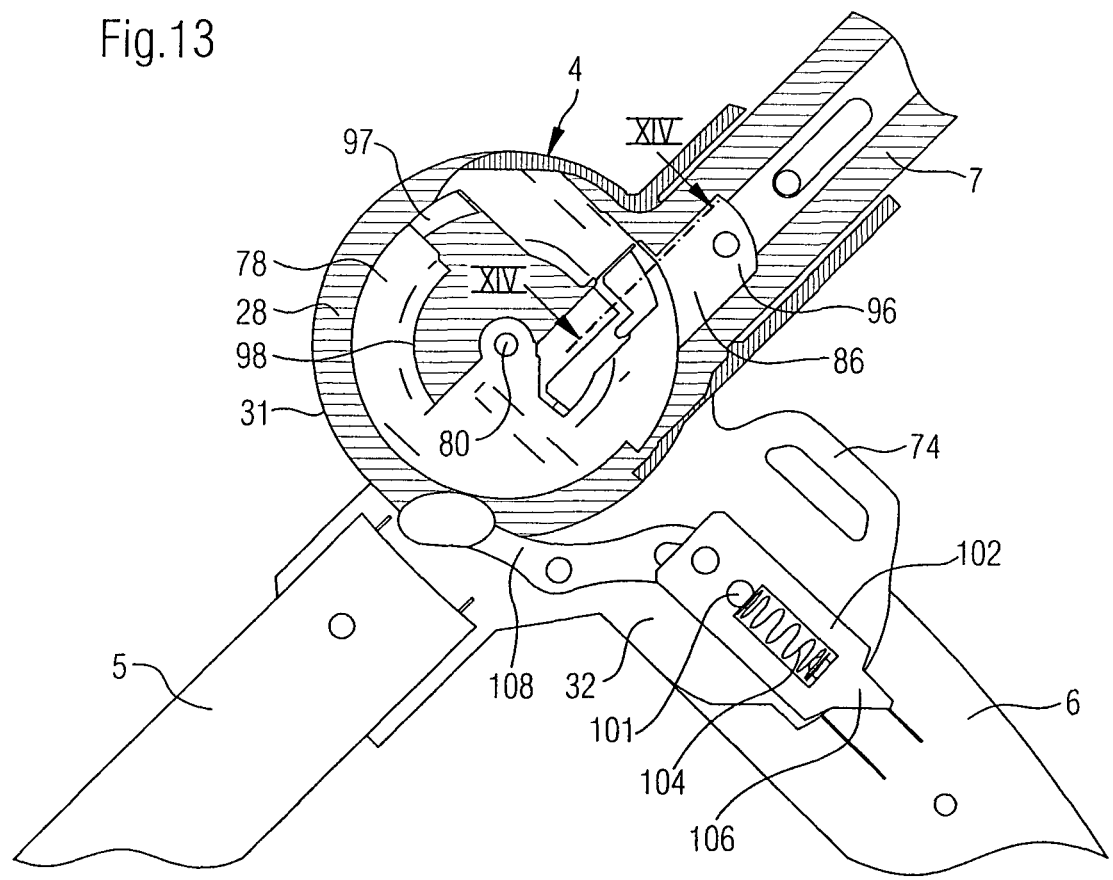
FIG. 13 shows the joint from FIG. 12 in an enlarged illustration.
Figure 14:
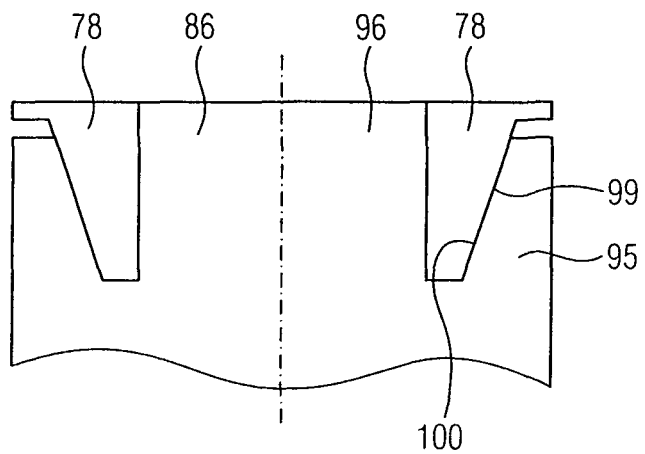
FIG. 14 shows a section of the joint according to FIG. 13 along the line XIV-XIV.
Figure 16:
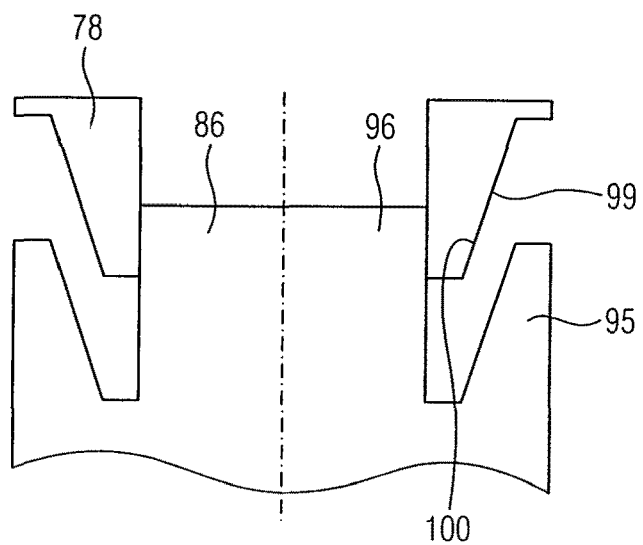
FIG. 16 shows an illustration, corresponding to FIG. 14, of the joint in the state according to FIG. 15.
Figure 18:
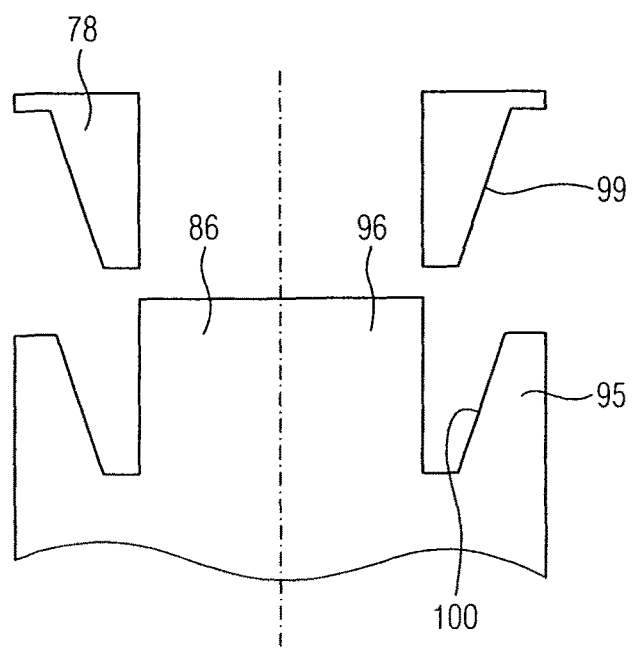
FIG. 18 shows an illustration, corresponding to FIGS. 14 and 16, of the joint in the state according to FIG. 17.

As shown in FIGS. 14, 16, and 18, the radial protruding areas 95 find gradually narrowing slot cross sections, thus ultimately coming to rest against inclined contact surfaces 99 at the edge of a widening 97 of a window 79 in the area of the free end of the radial widening 97. The two articulated plates 78 are thus firmly manually pulled with friction, and thus with maximum rigidity, against counterparts 100 to the contact surfaces 99 in the area of the laterally protruding areas 95. The joint is engaged and locked, as illustrated in FIGS. 13 and 14. This state is maintained in particular due to the fact that the actuating handle 93 is now swiveled all the way up, so that the topmost connecting joint 89 and the pivot axis 92 of the actuating lever 91 are situated one behind the other, approximately in the longitudinal direction of the rod assembly 87. The actuating lever 91 is thus locked with respect to any tensile or pressure force within the rod assembly 87.

It is apparent in FIGS. 15 and 16 that, although the contact surfaces 99 and 100 are released from one another after unlocking, under the influence of the spring 94, with the actuating handle 93 swiveled down by approximately 90° with respect to the locking position, the laterally protruding areas 95 of the locking element 86 remain engaged with the radial widenings 97 of the windows 79, so that swiveling the push bar 8 is still not possible. Since in this state the connecting line between the topmost connecting joint 89 and the pivot axis 92 of the actuating lever 91 is oriented approximately transversely with respect to the longitudinal direction of the rod assembly 87, the actuating lever 91 yields to any tensile or compressive stress within the rod assembly 87, and thus leaves the control of the locking element 86 to the spring 94.

As shown in FIGS. 17 and 18, if the actuating handle 93 is now manually pressed down, the spring 94 is overcome and the rod assembly 87 pushes the locking element 86 further into the joint 4 until the laterally protruding areas 95 of the locking element 86 are completely pushed out of the radial widening 97 in question.

Figure 19:
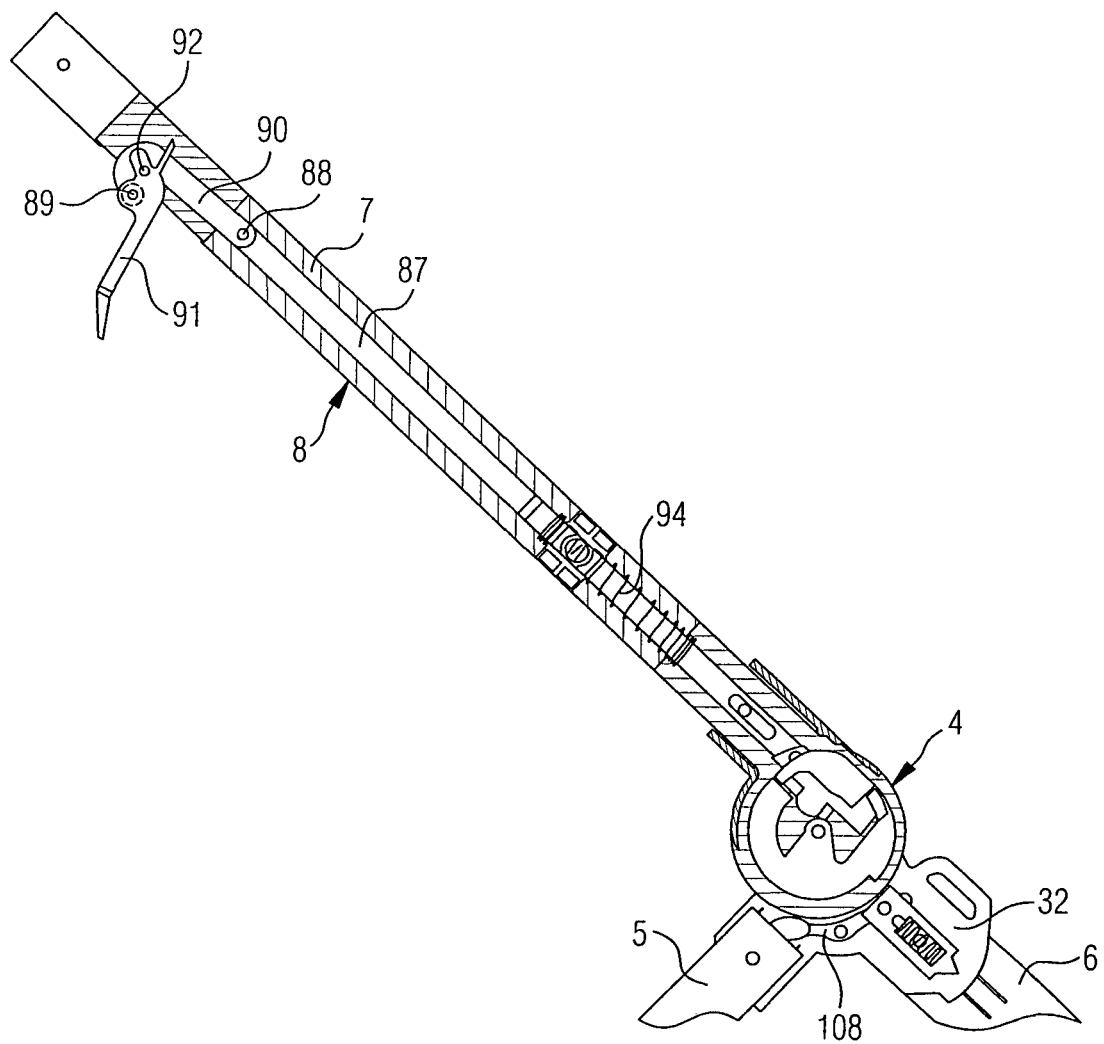
FIG. 19 shows the arrangement according to FIG. 17, with the initially disengaged push bar pivoted into the other operating position in which it is re-engaged, and with the displacement direction and thus the travel direction now reversed.

The locking element 86 together with its laterally protruding areas 95 is now freely movable within the arch-shaped window area 98, and the push bar 8 may be swiveled from the position according to FIG. 17 into the position according to FIG. 19, for example, where engagement with a different radial widening 97 is once again possible.

Figure 20:
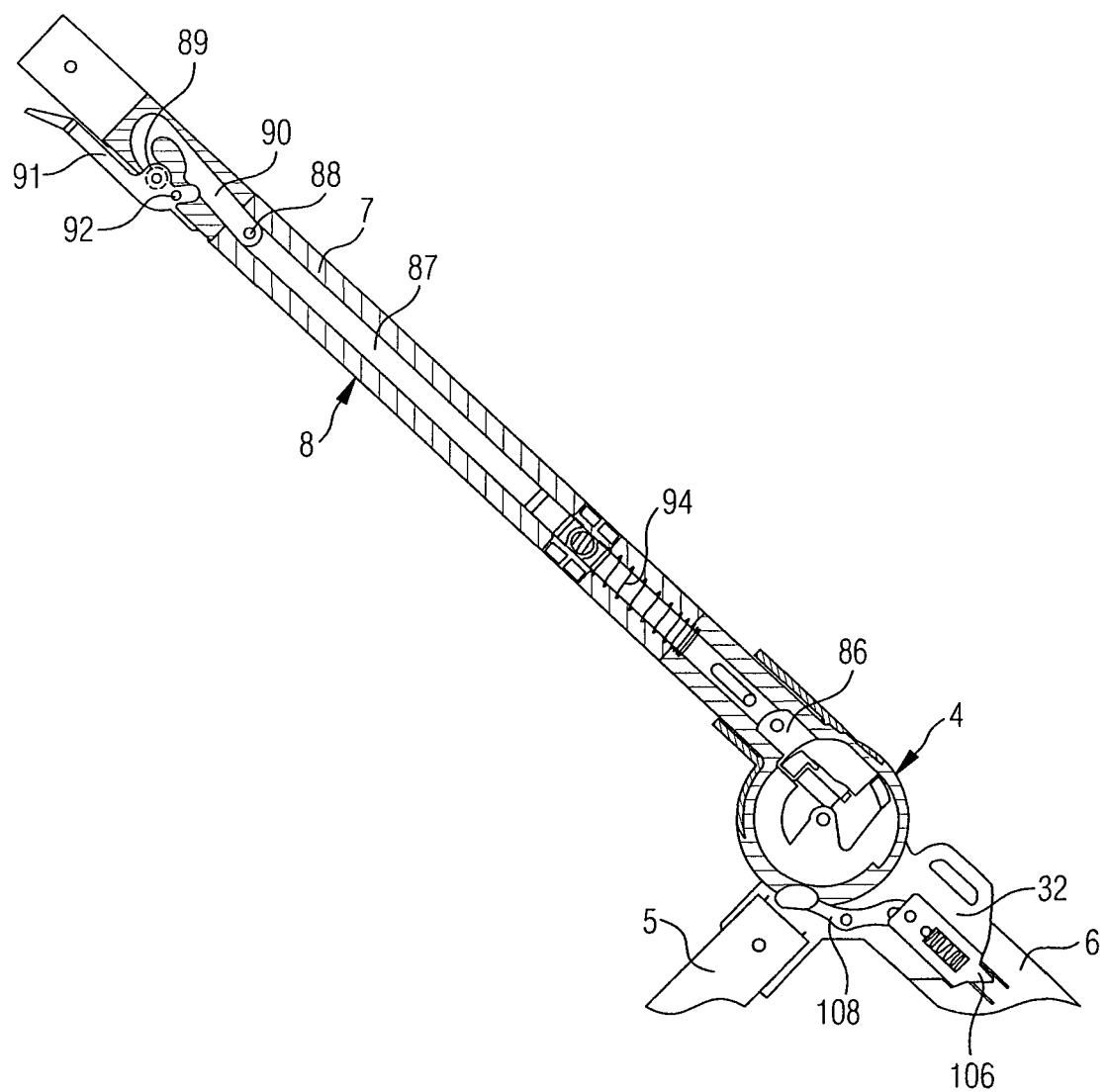
FIG. 20 shows the arrangement according to FIG. 18, with the push bar in the new operating position and now also locked.
Figure 21:
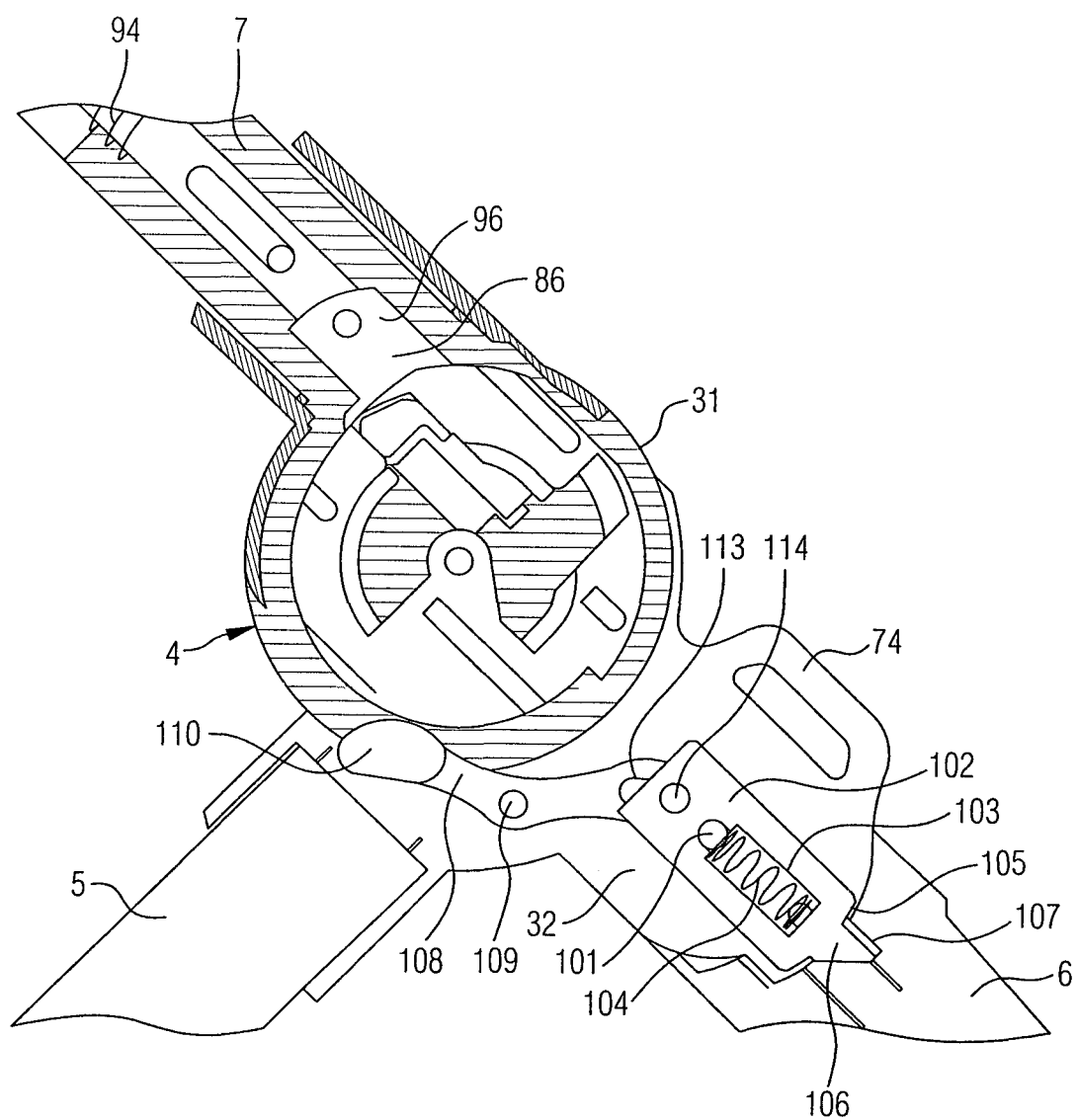
FIG. 21 shows the joint of the arrangement according to FIG. 18 in an enlarged illustration, in the completely locked state.

When this position of the push bar 8 is locked by pulling the actuating handle 93 all the way up, as shown in FIGS. 20 and 21, the baby carriage 1 may now be pushed in the opposite direction.

Figure 22:
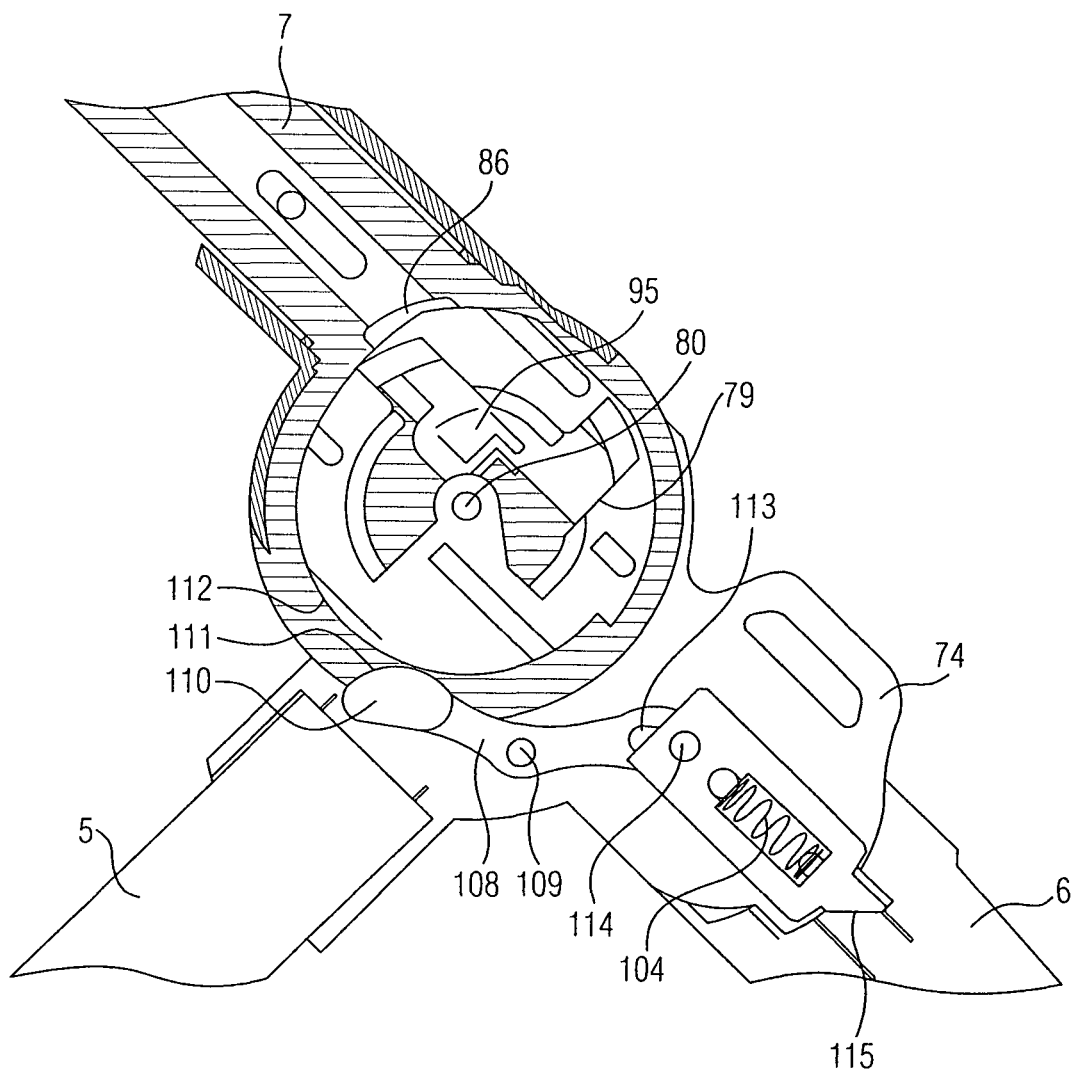
FIG. 22 shows the arrangement according to FIG. 21, with the push bar now unlocked.

However, if the baby carriage 1 is to be folded up, initially the push bar 8 is unlocked, as shown in FIG. 22, and lastly is manually disengaged from the radial window widening 97 in question by continuing to manually swivel the actuating handle 93 downwardly, similarly as shown in FIG. 17.

If the laterally protruding areas 95 of the locking element 86 are thus completely pushed out of the radial widening 97, the push bar 8 may be swiveled further until it is ultimately situated virtually in parallel to the adjacent strut 5, 6 of the chassis 2, preferably the front wheel strut 5 in question.

In order to completely fold up the baby carriage 1, the rear wheel strut 6 must now be swiveled toward the front wheel strut 5. For this purpose, however, the rear wheel strut 6 must first be unlocked. This is carried out by a largely automatic control, whose operating principle is apparent from FIGS. 21 through 24:

The strut 5, 6, preferably the rear wheel strut 6, which is pivotable with respect to the housing 28 of the joint 4, is pivotably supported on a second rotation axis 101 that is situated eccentrically with respect to the first rotation axis 80. This second rotation axis 101 is situated within the protrusion 32 that protrudes laterally from the lateral surface 31 of the joint 3. Depending on the embodiment, the strut 5, 6 in question may be situated between outer plates of the protrusion 32, or within a fork of the protrusion 32 that is provided on the housing side.

The engagement and disengagement of the strut 5, 6 in question is controlled by a second locking element 102 situated within the housing protrusion 32.

The second locking element 102 has an elongated hole 103 through which the second rotation axis 101 passes. The locking element 102 is thus guided with limited movability. A second spring 104, which is designed as a compression spring and/or as a coil spring, is situated within this elongated hole 103. This second spring 104 is supported on the one hand on the second rotation axis 101, and on the other hand on the end of the elongated hole 103 facing away from same. Since the second spring 104, viewed from the first rotation axis 80, is situated on the other side of the second rotation axis 101, it seeks to press the second locking element 102 away from the first rotation axis 80, in the direction of the particular strut 5, 6 of the chassis 2.

On the peripheral end-face side 105 facing away from the first rotation axis 80, the second locking element 102 has a projection 106 which is capable of engaging in a rearward recess 107 in the pivotable strut 5, 6, thus locking same.

The second spring 104 normally presses the locking element 102 against the rear side of the pivotable strut 5, 6, so that the projection 106 remains in the recess 107 and the engaged state is maintained.

The unlocking movement is derived from the movement of folding up the push bar 8. A rocker-shaped two-arm lever 108 that is supported within the housing 28 of the joint 4, in particular about a pivot axis 109 that is parallel to the first and/or second rotation axis 80, 101, is used for this purpose. This pivot axis passes transversely through the housing 28 of the joint, in particular, for example, in the area where the protrusion 32 branches off from the lateral surface 31 of the housing 28 of the joint 4.

One end of this two-arm lever 108 is designed as a cam 110 having a surface 111 that is convexly curved in areas. The convexly curved surface area faces the first rotation axis 80, and at the periphery of the central, disk-shaped part 81, this area 111 finds a contact surface 112 situated at a variable distance from the first rotation axis 80.

The other end of the two-arm lever 108 engages with a depression in the rearward end of the second locking element, and an elongated hole 113, which likewise engages, at least partially, with this depression, passes through the two-arm lever. A pin 114 passes transversely through this depression, and the pin 114 also passes through the elongated hole 113 in the two-arm lever 108.

The rocker-shaped lever is dimensioned in such a way that when the push bar 8 is folded up, the lever finds an area of the contact surface 112 that recedes in the radial direction, and with its cam 110 is thus able to swivel radially inwardly under the influence of the second spring 104, while the second locking element 102 with its protrusion 106 is thus pushed radially outwardly and downwardly into the rearward recess 107 of the strut 5, 6 in question. This strut is and remains engaged.

Figure 23:
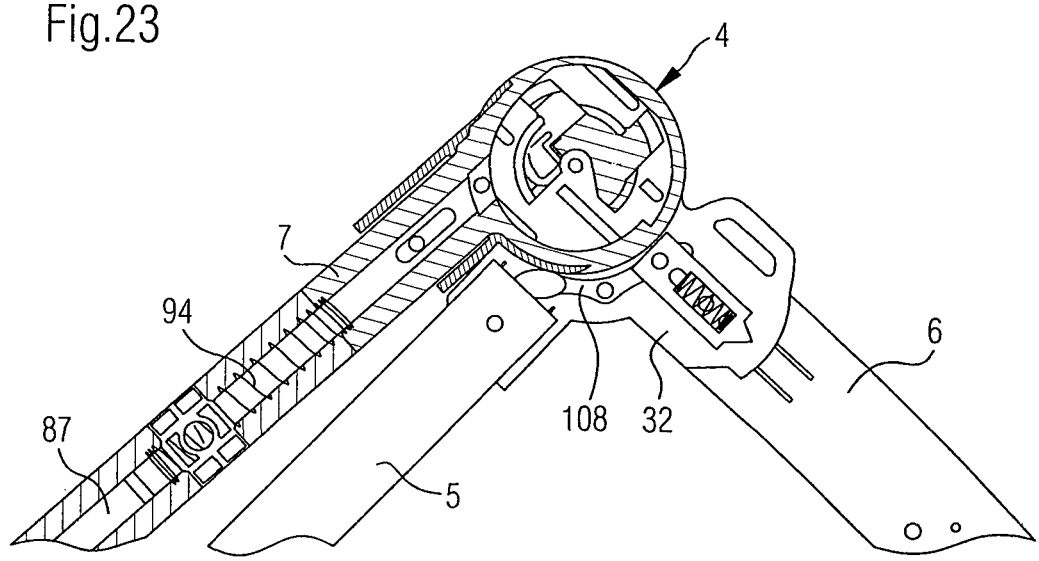
FIG. 23 shows the arrangement according to FIG. 22, with the push bar, after complete disengagement, being further pivoted until reaching a folded-up position, i.e., folded against a strut of the chassis, and on the other hand with the catch mechanism for the second chassis strut, which is adjustable with respect to the housing of the joint, being disengaged.
Figure 24:
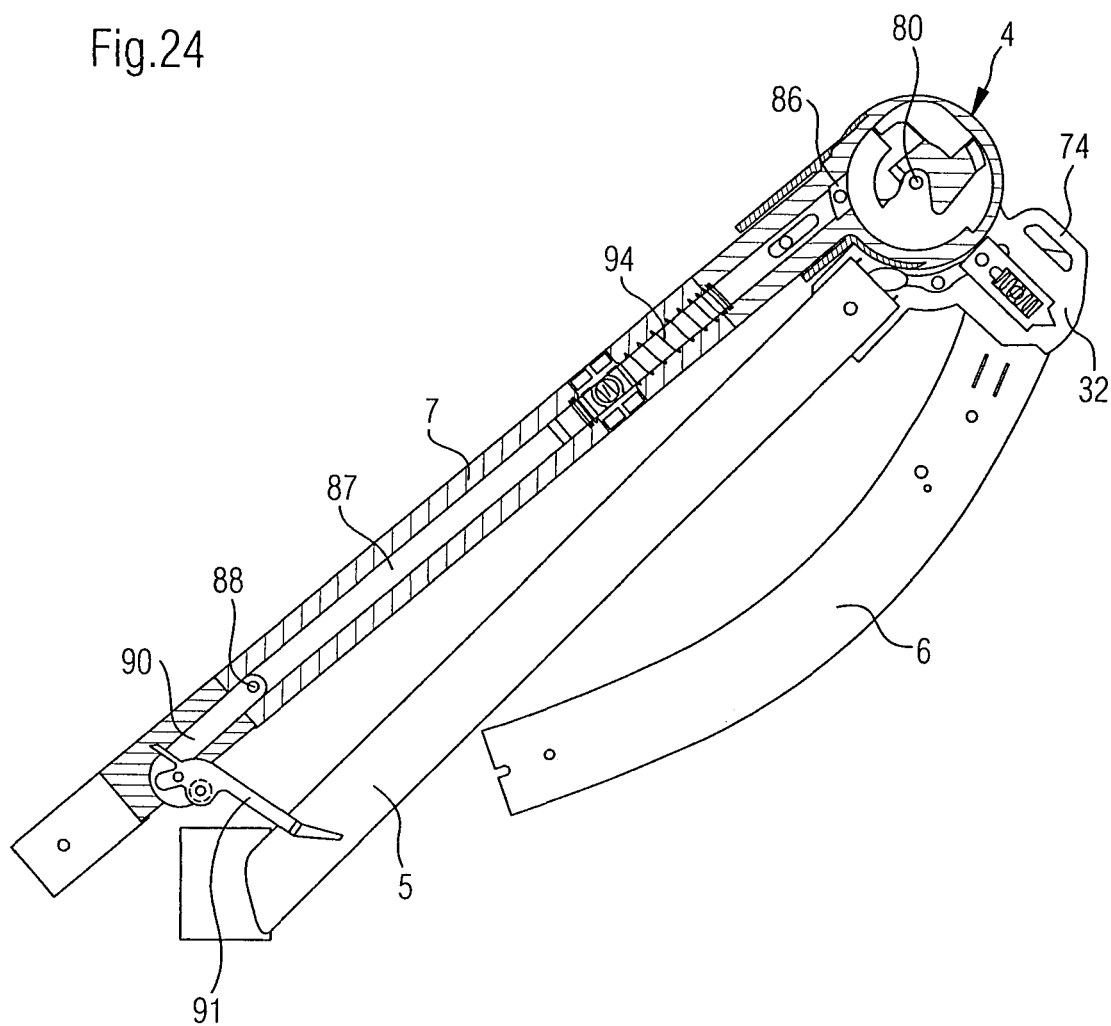
FIG. 24 shows the chassis in a view corresponding to FIG. 24, but completely folded up, so that the push bar on the one hand and a chassis strut on the other hand are folded against the other chassis strut.
Figure 25:
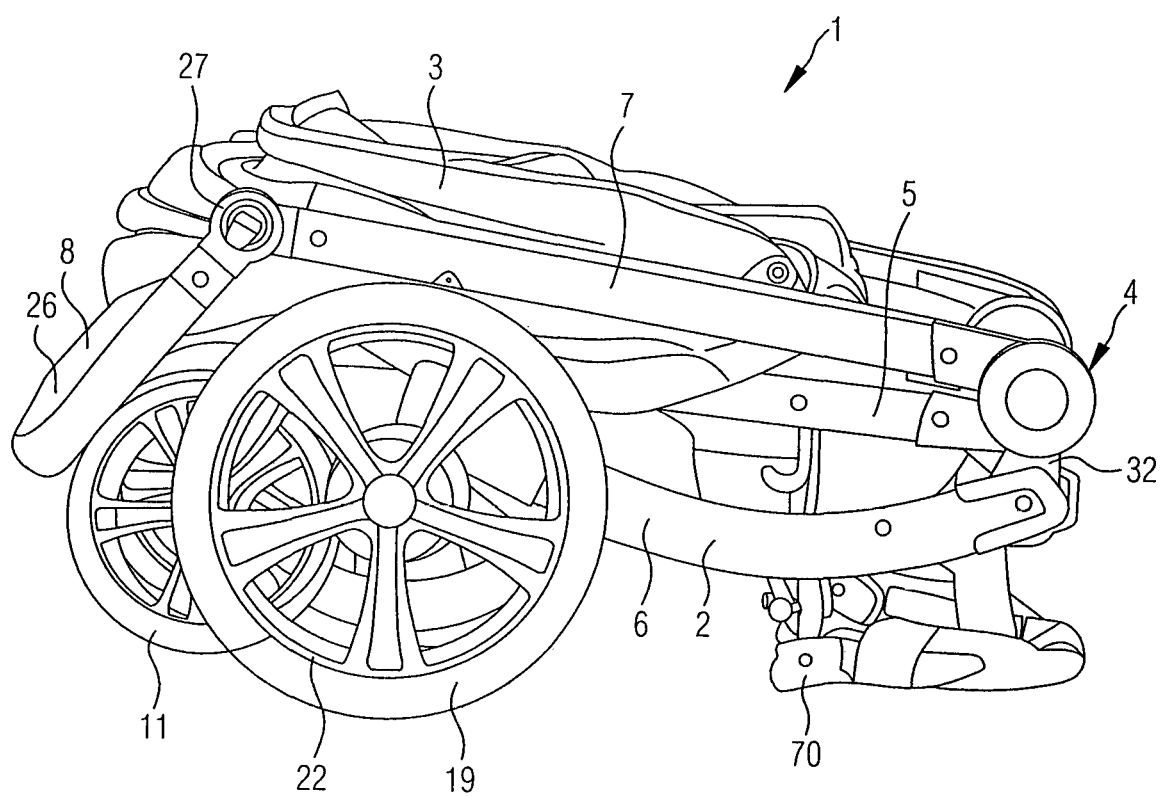
FIG. 25 shows the entire baby carriage with a folded-up chassis corresponding to FIG. 24, without the attachment having to be removed beforehand.

If the push bar 8 is now swiveled all the way down, as shown in FIG. 23, the cam 110 gradually meets a further radially protruding part of the contact surface 12, thus swiveling the cam arm of the rocker-shaped lever 108 radially outwardly. At the same time, the other arm is swiveled radially inwardly, i.e., toward the first rotation axis 80 and away from the second rotation axis 101. As a result, this lever pulls the pin 114, which is engaged in its elongated hole 113, and thus the entire second locking element 102, back from the pivotable strut 5, 6 in question, the projection 106 leaves the recess 107, and the pivotable strut 5, 6 may be swiveled down against the strut 5, 6 fixed to the housing. The end result, namely, the completely folded-up state, is shown in FIGS. 24 and 25.

In order for the unfolding operation to also take place preferably automatically, the edge 115 facing the folding-up direction of the pivotable strut 5, 6 in question is beveled at the projection 106, and thus moves back radially toward the second rotation axis 101 as movement continues in the folding-up direction. When the pivotable strut 5, 6 is unfolded, it lightly moves along this beveled edge area 115 at the rear side of the unfolding strut 5, 6, and in each case presses the second locking element 102 inwardly far enough until the projection 106 is situated directly opposite the recess 108, and ultimately is able to snap into same due to the force of the second spring 103.

FIG. 26, which is substantially the same as FIG. 16, shows that a perpendicular to the undercut or contact surface 99, which is encloseable or contactable by the adjustable articulated element 86, encloses an angle α, with the axis of rotation 80 that is preferably greater than or equal to 2°, or that is greater than or equal to 5°, or that is greater than or equal to 10°. On the other hand, the angle α is preferably less than or equal to 45°, or is less than or equal to 30°, or is less than or equal to 20°.

List of reference numerals 1 baby carriage
2 chassis
3 attachment
4 joint
5 front wheel strut
6 rear wheel strut
7 side leg
8 push bar
9 rotary joint
10 fork-shaped holder
11 front wheel
12 spoke
13 wheel hub
14 rim
15 tire
16 strut
17 transport mat
18 strut
19 rear wheel
20 wheel hub
21 spoke
22 rim
23 tire
24 axle
25 Bowden cable
26 handle

List of reference numerals

- 27 joint
- 28 housing
- 29 inner end-face side
- 30 outer end-face side
- 31 lateral surface
- 32 protrusion
- 33 connector
- 34 disk
- 35 slot
- 36 web
- 37 disk
- 38 depression
- 39 protrusion
- 40 tongue
- 41 tab
- 42 lateral surface
- 43 support bar
- 44 side leg
- 45 crosspiece
- 46 waist bar
- 47 sleeve
- 48 seat shell
- 49 upper area
- 50 side edge
- 51 push snap
- 52 middle area
- 53 edge area
- 54 seat back
- 55 sitting surface
- 56 transition area
- 57 side support
- 58 belt
- 59 shoulder belt
- 60 slot
- 61 belt buckle
- 62 waist belt
- 63 lower belt
- 64 sitting surface support
- 65 protrusion
- 66 front edge
- 67 lower leg flap
- 68 pocket
- 69 lower leg support
- 70 joint
- 71 canopy
- 72 canopy bar
- 73 fastening area
- 74 securing eye
- 75 rib-shaped elevation
- 76 grooved depression
- 77 outer side
- 78 articulated plate
- 79 window
- 80 rotation axis
- 81 disk-shaped part
- 82 connection
- 83 protrusion
- 84 screw
- 85 window
- 86 locking element
- 87 rod assembly
- 88 connecting joint
- 89 connecting joint
- 90 connecting lever
- 91 actuating lever
- 92 pivot axis
- 93 actuating handle
- 94 spring
- 95 area
- 96 body
- 97 widening
- 98 arch-shaped area
- 99 contact surface
- 100 counterpart contact surface
- 101 second rotation axis
- 102 second locking element
- 103 elongated hole
- 104 second spring
- 105 end-face side
- 106 projection
- 107 recess
- 108 two-arm lever
- 109 pivot axis
- 110 cam
- 111 convex surface
- 112 contact surface
- 113 elongated hole
- 114 pin
- 115 beveled edge
- 116 locking mechanism
- 117 actuating element
- 118 vertex
- 119 sleeve
- 120 tab
- 121 recessed area
- 122 inner side
- 123 half-shell
- 124 depression
- 125 pin
- 126 traction means
- 127 eye
- 128 opening
- 129 control element
- 130 transverse hole
- 131 thickening element
- 132 spring element
- 133 transverse pin
- 134 housing
- 135 web
- 136 plate
- 137 disk-shaped element
- 138 rotation axis
- 139 arch-shaped depression
- 140 engagement widening
- 141 ring-shaped element
- 142 edge
- 143 trough-shaped depression

The invention claimed is:

1. A baby carriage, comprising lateral articulated joints, each having a connection for a leg of a push bar, a front wheel strut and/or a rear wheel strut, of which at least two elements are pivotable relative to one another about an articulated axis extending transversely with respect to a travel direction, the connection for a first of at least two elements of an articulated joint which are pivotable relative to one another being connected in a rotatably fixed manner to an inner disk-shaped part of the articulated joint, and the connection for a second of the at least two elements of said articulated joint which are pivotable relative to one another being connected or coupled in a rotatably fixed manner to at least two housing face plates in parallel to the disk-shaped part, and/or to articulated plates of said articulated joint situated between said at least two housing face plates, the plates gripping the inner disk-shaped part at its two flat sides, characterized in that
   a) at least two housing end plates and/or articulated plates on both sides of the inner disk-shaped part may be pulled toward one another by means of a connecting part and thus frictionally and/or interlockingly pressed from both sides against the inner disk-shaped part of the articulated joint in order to lock the articulated joint, but by loosening the connecting part are releasable from the inner disk-shaped part to such an extent that the frictional and interlocking connection is released for relative adjustment of the articulated joint, b) wherein there is provided at the inner sides of end-side faces of the housing, or on or in one or more parts fixed thereto, at least one depression or undercut or through-hole recess extending along an arc-shaped curve with ends, which is concentric to the articulated axis of the articulated joint;

c) into which an articulated element can engage, which is rotatably adjustable, together with the first one of the at least two elements of the articulated joint which are pivotable relative to one another connected thereto, between the ends of the arc-shaped area of the at least one depression or undercut or through-hole recess.

2. The baby carriage according to claim 1, characterized in that the locking of at least one articulated joint has a two-stage design comprising automatic engagement and manually actuated locking.

3. The baby carriage according to claim 1, characterized in that the articulated joint is enclosed by a housing which has a cylindrical basic shape, with a lateral surface enclosing the articulated axis, and said two end-side faces closing off the lateral surface at both ends.

4. The baby carriage according to claim 1, characterized in that the adjustable articulated element is adjustable with respect to the articulated axis in two different spatial directions, or is adjustable in a radial direction and in an azimuthal direction.

5. The baby carriage according to claim 4, characterized in that the adjustable articulated element is carried along in the azimuthal direction by a part of the baby carriage that is connected to the joint, or that is connected to the joint by a connector or side leg of the push bar.

6. The baby carriage according to claim 4, characterized in that the radial adjustment of the adjustable articulated element may be effected by means of a mechanism that may be subjected to tensile and compressive load, or by means of a rod assembly.

7. The baby carriage according to claim 6, characterized in that the mechanism that may be subjected to tensile and compressive load, or the rod assembly, is accommodated within a hollow bar or side leg of the push bar.

8. The baby carriage according to claim 7, characterized in that an element of the mechanism that may be subjected to tensile and compressive load, or of the rod assembly, is pretensioned via a spring element that is supported on said hollow bar or side leg of the push bar.

9. The baby carriage according to claim 6, characterized in that an element of the mechanism or of the rod assembly that may be subjected to tensile and compressive load is a rod without a straight shape, which extends along a slightly curved, arch-shaped course, or which extends along a slightly curved, arch-shaped course that (i) curves in only one direction, or that (ii) may have at least one inflection point with adjoining bends in opposite directions.

10. The baby carriage according to claim 6, characterized in that an element of the mechanism that may be subjected to tensile and compressive load, or of the rod assembly, is coupled to an actuating element in the upper area of a hollow bar, side leg, or a handle of the push bar.

11. The baby carriage according to claim 1, characterized in that the arc-shaped area of the at least one depression, or undercut, or through-hole recess in said part has at least one radial widening at one, or two, or more locations which allow radial movement of the adjustable articulated element at said one, or two, or more locations.

12. The baby carriage according to claim 11, characterized in that the at least one radial widening of the arc-shaped area of the at least one depression, or undercut, or through-hole recess in said part extends radially outwardly from the arc-shaped area.

13. The baby carriage according to claim 11, characterized in that the adjustable articulated element is pretensioned by at least one spring element in the radial direction in which the at least one radial widening of the arc-shaped area of the at least one depression, or undercut, or through-hole recess in said part extend.

14. The baby carriage according to claim 11, characterized in that the at least one radial widening of the arc-shaped area of the at least one depression, or undercut, or through-hole recess in said part have a front delimiting surface in a direction of rotation and a rear delimiting surface in the said direction of rotation for limiting or avoiding further rotary adjustment of the adjustable articulated element engaged therein.

15. The baby carriage according to claim 14, characterized in that front and rear delimiting surfaces of a radial widening of the arc-shaped area extend in parallel to one another.

16. The baby carriage according to claim 14, characterized in that mutually parallel front and rear delimiting surfaces of a radial widening of the arc-shaped area have no undercuts, or no undercuts which enclose the adjustable articulated element with an exact fit.

17. The baby carriage according to claim 1, characterized in that at least one radial widening of an arc-shaped area has at least one undercut or contact surface, at a radial end thereof facing away from the arc-shaped area or in the vicinity thereof, which is encloseable or contactable by the adjustable articulated element.

18. The baby carriage according to claim 17, characterized in that the undercut or contact surface which is enclosable or contactable by the adjustable articulated element is flat, at least in areas, at or in the vicinity of the end(s) of the at least one radial widening of the arc-shaped area of the at least one depression, or undercut, or through-hole recess.

19. The baby carriage according to claim 17, characterized in that the undercut or contact surface which is enclosable or contactable by the adjustable articulated element is in each case turned outwardly at or in the vicinity of the end(s) of the at least one radial widening of the arc-shaped area, facing towards the next closest end-side face of the housing.

20. The baby carriage according to claim 17, characterized in that the articulated axis passes oblique-angled through the undercut or contact surface which is enclosable or contactable by the adjustable articulated element at or in the vicinity of the end(s) of the at least one radial widening of the arc-shaped area, and the undercut or contact surface extends outwardly toward the peripheral end of the at least one radial widening in the longitudinal direction thereof, toward the next closest end-side face of the housing.

21. The baby carriage according to claim 17, characterized in that a perpendicular to the undercut or contact surface which is enclosable or contactable by the adjustable articulated element encloses an angle, at or in the vicinity of the end of a radial widening of the arc-shaped area of the depression, undercut, and/or through-hole recess, with the articulated axis that is greater than or equal to 2°, or that is greater than or equal to 5°, or that is greater than or equal to 10°.

22. The baby carriage according to claim 17, characterized in that that a perpendicular to the undercut or contact surface which is enclosable or contactable by the adjustable articulated element encloses an angle, at or in the vicinity of the end of a radial widening of the arc-shaped area of the depression, undercut, and/or through-hole recess, with the articulated axis that is less than or equal to 45°, or that is less than or equal to 30°, or that is less than or equal to 20°.

23. The baby carriage according to claim 14, characterized in that a counterpart for each undercut or contact surface which is enclosable or contactable is provided on the adjustable articulated element in the area of one or both end-side faces of the housing.

24. The baby carriage according to claim 17, characterized in that a counterpart of the adjustable articulated element is designed as a surface that is in parallel to said undercut or contact surface which is enclosable or contactable by the adjustable articulated element.

25. The baby carriage according to claim 1, characterized in that, on the adjustable articulated part in the area of said two end-side faces of the housing, a surface that is in parallel to each one of an undercut or contact surface at that location is provided.

26. The baby carriage according to claim 1, characterized in that a front wheel strut, a rear wheel strut, and/or a leg of the push bar lie in a shared plane.

27. The baby carriage according to claim 1, characterized in that for releasing the locking of an articulated joint, a rocker is used which operates against at least one spring element.

28. The baby carriage according to claim 1, characterized in that an adapter is fixed or fixable to at least one joint, by means of which various attachments may be mounted on the chassis of the baby carriage.

29. The baby carriage according to claim 1, characterized in that an attachment comprises a folding frame for a canopy which is fixable to an adapter of the chassis and is not mechanically connected to further frame and/or support parts of a seating surface of the attachment,
and the frame and/or support parts of the seating surface of the attachment are suspended, at most on the folding frame for the canopy via the material or cover material of the attachment.

30. A baby carriage comprising:
an articulated joint for selectively pivoting a first element relative to a second element, the articulated joint comprising:
a first housing plate comprising an inner surface and an outer surface, and a second housing plate comprising an inner surface and an outer surface, the inner surface of the first housing plate facing the inner surface of the second housing plate and being separated by a gap;
a joint axis passing through the first housing plate and the second housing plate so as to define a rotational axis for the articulated joint;
a first articulated plate fixedly mounted to the inner surface of the first housing plate, the first articulated plate comprising a first window formed therein, the first window extending concentrically about the joint axis;
at least one first window radial widening extending radially away from the first window;
a second articulated plate fixedly mounted to the inner surface of the second housing plate, the second articulated plate comprising a second window formed therein, the second window extending concentrically about the joint axis;
at least one second window radial widening extending radially away from the second window;
a disk-shaped part disposed in the gap between the first articulated plate and the second articulated plate, the disk-shaped part comprising a central window, the central window of the disk-shaped part communicating with the first window of the first articulated plate and the second window of the second articulated plate;
a locking element comprising a laterally-projecting element, the locking element being movable relative to the disk-shaped part and having the laterally-projecting element disposed in the central window of the disk-shaped part such that the laterally-projecting element projects into the first window of the first articulated plate and the second window of the second articulated plate;
wherein the locking element is selectively movable between a locked position and an unlocked position;
wherein, when the locking element is in its unlocked position, the laterally-projecting element of the locking element is disposed in (i) the first window of the first articulated plate, and (ii) the second window of the second articulated plate, such that the disk-shaped part is able to pivot about the rotational axis relative to the first housing plate and the second housing plate, and further wherein when the locking element is moved to its locked position, the laterally-projecting element of the locking element is disposed in (i) the at least one first window radial widening of the first window, and (ii) the at least one second window radial widening of the second window, such that the disk-shaped part is unable to pivot about the rotational axis relative to the first housing plate and the second housing plate.

* * * * *